United States Patent
Tamata et al.

(10) Patent No.: US 6,652,817 B1
(45) Date of Patent: Nov. 25, 2003

(54) APPARATUS FOR PROCESSING ORGANOHALOGEN COMPOUNDS

(75) Inventors: Shin Tamata, Ooarai-machi (JP); Satoru Ohashi, Mito (JP); Toshihide Takano, Tomobe-machi (JP); Hisao Yokoyama, Hitachioota (JP); Toshihiro Mori, Toukai-mura (JP)

(73) Assignees: Hitachi, Ltd., Tokyo (JP); Hitachi Engineering Co., Ltd., Ibaraki (JP)

( * ) Notice: Subject to any disclaimer, the term of this patent is extended or adjusted under 35 U.S.C. 154(b) by 0 days.

(21) Appl. No.: 09/182,047

(22) Filed: Oct. 29, 1998

Related U.S. Application Data

(62) Division of application No. 08/658,646, filed on Feb. 12, 1998, now Pat. No. 5,977,427.

(30) Foreign Application Priority Data

Jun. 14, 1995 (JP) .............................. 7-147094

(51) Int. Cl.[7] .................. B01J 8/00; B01J 8/04; B01J 35/00; B01D 47/00; B01D 47/06
(52) U.S. Cl. ............... 422/194; 422/205; 422/207; 422/211; 423/210; 423/245.1; 423/488
(58) Field of Search .................. 422/211, 194, 422/198, 205, 207; 423/210, 240 S, 245.1, 245.3, 481, 488, 659; 502/309

(56) References Cited

U.S. PATENT DOCUMENTS

| | | | |
|---|---|---|---|
| 3,453,073 A | | 7/1969 | Sims ........................ 423/481 |
| 4,690,807 A | * | 9/1987 | Saleem .................... 423/242 |
| 4,937,051 A | * | 6/1990 | Graven et al. ........... 422/194 |
| 4,983,366 A | | 1/1991 | Deller et al. ............. 423/240 |
| 5,126,117 A | | 6/1992 | Schumacher et al. ..... 423/210 |
| 5,151,263 A | * | 9/1992 | Okazaki et al. .......... 423/659 |
| 5,206,003 A | * | 4/1993 | Imoto et al. .............. 423/240 |
| 5,362,458 A | * | 11/1994 | Saleem et al. ........ 423/243.06 |
| 5,457,267 A | * | 10/1995 | Jansen et al. .............. 588/206 |
| 5,480,624 A | * | 1/1996 | Kuivalainen ............. 423/210 |
| 5,759,504 A | * | 6/1998 | Kanno et al. ........... 423/240 S |

FOREIGN PATENT DOCUMENTS

| | | | |
|---|---|---|---|
| CA | 2021378 | 1/1992 | |
| DE | 36 40 573 | 6/1987 | |
| EP | 407210 | 1/1991 | |
| EP | 412456 | 2/1991 | ............. 588/206 |
| EP | 485787 | 5/1992 | |
| EP | 604110 | 6/1994 | |
| GB | 1233392 | 5/1971 | |
| JP | 52-114468 | 9/1977 | |
| JP | 3-42015 | 2/1991 | |
| JP | 3-66388 | 3/1991 | |
| JP | 6-63357 | 3/1994 | |
| JP | 6-106172 | 4/1994 | |
| WO | 82/02001 | 6/1982 | |

* cited by examiner

Primary Examiner—Jerry D. Johnson
Assistant Examiner—Alexa S Doroshenk
(74) Attorney, Agent, or Firm—Mattingly, Stanger & Malur, P.C.

(57) ABSTRACT

An apparatus for processing an organohalogen compounds includes a catalyst container containing a catalyst layer, a supplying path for supplying a carrier gas containing organohalogen compounds and steam through the catalyst container, a cooling chamber arranged at a lower portion of the catalyst container, a spraying apparatus mounted in the cooling chamber for spraying a cooling liquid to cool exhaust gas containing a decomposed gas of the organohalogen compounds exhausted from the catalyst layer and a baffle member forming a bent path which introduces the exhaust gas containing the decomposed gas into the cooling chamber from the catalyst layer and mounted in the cooling chamber for preventing mists generated by spraying cooling liquid from the spraying apparatus from back flowing into the catalyst container.

6 Claims, 9 Drawing Sheets

APPARATUS FOR PROCESSING ORGANOHALOGEN COMPOUNDS

This is a divisional application of U.S. Ser. No. 08/658,646, filed Feb. 12, 1998, now U.S. Pat. No. 5,977,427.

BACKGROUND OF THE INVENTION

(1) Field of the Invention

The present invention relates to a method for treating an of organohalogen compound, particularly, to a preferred method for treating the organohalogen compound by destroying the organohalogen compound with a catalyst.

(2) Description of the Prior Art

Organohalogen compounds contaminate air, rivers, water underground, soil, etc. Particularly, the organohalogen compounds having toxicity such as a cancer-causing property are regarded as problems in view of environmental pollution. Release suppression technology of the organohalogen compound, and destruction-treatment technology of the organohalogen compound existing in the environment as contaminants after releasing are now under development. The above destruction-treatment technology is aimed at destructing the organohalogen compound in released waste or in the environment after releasing. Therefore, an object of the destruction-treatment is the organohalogen compound of relatively low concentration. Currently, there are some organohalogen compounds which are regarded as a source material of ozone layer destruction, or a source material of green effect, even if it may be less toxic.

Therefore, release suppression technology and recovery-treatment technology for such organohalogen compounds are now under development. In the recovery-treatment technology, a large amount of recovered organohalogen compound is treated for destruction. Therefore, in view of economical aspect of the facility, it is necessary to destruct the organohalogen compound of relatively high concentration, and to make it harmless.

As for a treating method to make the organohalogen compound harmless, there are various methods which are well known. Among the various methods, a method for destruction by combustion, a method for destruction using plasma, and a method for destruction by cracking using high temperature steam have a large defect such as a large energy consumption. A method for destruction by ultraviolet ray, a method for destruction by irradiation, and a method for destruction using a micro-organism have a small destruction efficiency and a small destructing velocity. A method for destruction of an organohalogen compound using combustion has a problem to generate strong poisonous substance such as dioxin. On the contrary, a method for destructing the organohalogen compound using a catalyst receives an attention as a most effective method, because the method scarcely has the above described defects.

As for the method for treating organohalogen compounds using a catalyst, various methods have been disclosed hitherto, for example, as follows; JP-A-52-114468 (1977) disclosed a treating method using a catalytic destruction apparatus of air including an organohalogen compound. JP-A-3-42015 (1991) disclosed a method for destructing recovered flons. JP-A-3-66388 (1991) disclosed a treating method of flon of high concentration such as 6 mole %.

Destructing objects of the treating method disclosed in JP-A-52-114468 (1977) are organohalogen compounds of extremely low concentration. Therefore, it is difficult to destruct recovered organohalogen compounds, of which treatment has currently been becoming necessary, with a high efficiency under a high concentration. The treating method disclosed in JP-A-52-114468 (1977) does not teach any countermeasure against corrosion products, which are generated with heating the organohalogen compound, because concentrations of corrosive materials (chlorine, hydrogen chloride, fluorine, hydrogen fluoride etc.) generated at the destruction of the organohalogen compound are low. Furthermore, the treating method taught only insufficient countermeasure against corrosive materials generated with destructing the organohalogen compound. The method disclosed in JP-A-3-42015 (1991) is a method treating organohalogen compound of low concentrations such as 5000 ppm, and therefore, no countermeasure for the corrosive materials generated at heating and destructing the organohalogen compound was taught, which is the same in JP-A-52-114468 (1977).

The treating method disclosed in JP-A-3-66388 (1991) did not teach any practical means for supplying flon of a high concentration, nor any countermeasure against corrosive materials generated by heating the organohalogen compound. Furthermore, no practical countermeasure against corrosive materials generated at destructing flon was taught except neutralization with an alkali.

One of a few defects of the destruction method for an organohalogen compound using a catalyst is a smaller destructing efficiency than destructing efficiencies of the destructing method by combustion and the destructing method by plasma. The destructing efficiencies of the organohalogen compound by the destructing method by combustion and the destructing method by plasma is approximately in a range of 99.999~99.9999%. On the contrary, the destructing efficiencies of the organohalogen compound by the destructing method using a catalyst is approximately in a range of 99.9~99.99%. The above destructing efficiencies of the destructing method using a catalyst scarcely make a problem in practical use. However, when the method is applied to a material such as flon, to which the United Nation Environmental Plan gives a guideline for the destructing efficiency as at least 99.99%, it is necessary to add an extra means in order to comply with the guideline. For example, JP-A-6-106172 discloses a method, in which undestructed organohalogen compound in exhaust gas from the catalytic destruction process are eliminated from the exhaust gas by being adsorbed into an adsorbent. The undestructed organohalogen compounds adsorbed in the adsorbent are released and treated again with the catalyst. However, in accordance with the above method, the main catalytic destruction process must be stopped when the released undestructed organohalogen compounds from the adsorbent are treated, and accordingly, the operation efficiency of the catalytic destruction facility is decreased.

As explained above, conventional methods for treating the organohalogen compounds have difficulty in operating the facility for destructing the organohalogen compound of a high concentration with a high destructing efficiency, a high operating efficiency of the facility, and appropriate countermeasures against corrosive materials generated by the destruction.

SUMMARY OF THE INVENTION

(1) Objects of the Invention

The object of the present invention is to provide a method for treating an organohalogen compound, which is capable of suppressing generation of corrosive material and destructing the organohalogen compound effectively, and an apparatus therefor.

Another object of the present invention is to provide a method for treating an organohalogen compound, which is capable of suppressing generation of corrosive material further, and an apparatus therefor.

Another object of the present invention is to provide a method for treating an organohalogen compound, which is capable of controlling supplying the amount of the organohalogen compound easily.

Another object of the present invention is to provide a method for treating an organohalogen compound, which is capable of simplifying the water supplying facility.

Another object of the present invention is to provide a method for treating an organohalogen compound, which is capable of simplifying the water supplying facility.

Another object of the present invention is to provide a method for treating an organohalogen compound, which is capable of protecting corrosion at the upstream region of the catalytic layer.

Another object of the present invention is to provide a method for treating an organohalogen compound, which is capable of suppressing corrosion caused by the destruction gas, which is generated by catalytic destruction of the organohalogen compound, and an apparatus therefor.

Another object of the present invention is to provide a method for treating an organohalogen compound, which is capable of preventing the exhaust gas released from the catalytic layer from generating poisonous substance.

Another object of the present invention is to provide a method for treating an organohalogen compound, which is capable of improving the corrosive environment caused by the exhaust gas released from the catalytic layer.

Another object of the present invention is to provide an apparatus for treating an organohalogen compound, which is capable of suppressing corrosion of the structural material of the catalytic layer.

Another object of the present invention is to provide an apparatus for treating an organohalogen compound, which is capable of improving an efficiency of removal for the acidic gas released from the catalytic layer.

(2) Methods for Solving the Problem

The feature of a first aspect of the invention for of achieving the objects of the present invention is in the steps of heating a carrier gas by a heater, adding organohalogen compound to the carrier gas passed through the heater, and supplying a carrier gas containing organohalogen compound to a catalytic layer.

The feature of a second aspect of the invention for achieving the objects of the present invention is in adding the organohalogen compound to the carrier gas which has been mixed with steam.

The feature of a third aspect of the invention for achieving the objects of the present invention is in adding the organohalogen compound in a liquid condition, which is in a liquid state at room temperature, to the carrier gas.

The feature of a fourth aspect of the invention for by achieving the objects of the present invention is in adding the organohalogen compound in a liquid state under a pressurized condition, which has a boiling point near the room temperature, to the carrier gas.

The feature of a fifth aspect of the invention for achieving the objects of the present invention is in the steps of burning hydrogen or hydrocarbon fuel in the heater, adding the organohalogen compound to the combustion gas released from the heater, and supplying the combustion gas containing the organohalogen compound to the carrier gas.

The feature of a sixth aspect of the invention for achieving the objects of the present invention is in controlling the heating temperature at the heater so that the temperature of the gas released from the heater is in a range from a temperature where at the organohalogen compound destructs with catalyst to a temperature where at the organohalogen compound itself starts to destruct at least partly.

The feature of a seventh aspect of the invention for achieving the objects of the present invention is in cooling the exhaust gas soon after release from the catalytic layer.

The feature of an eighth aspect of the invention for achieving the objects of the present invention is in that the organohalogen compound is a gas containing chlorine, and the exhaust gas released from the catalytic layer is cooled soon after the releasing.

The feature of a ninth aspect of the invention for achieving the objects of the present invention is in adding a reactive material, which reacts with the acidic gas contained in the exhaust gas which is released from the catalytic layer, to the exhaust gas released from the catalytic layer.

The feature of a tenth aspect of the invention for achieving the objects of the present invention is in providing a means for preventing the entry of mist, which is generated with liquid spray by a spraying means, into the catalytic layer in a space which is formed in a catalyst container at downstream region of the catalytic layer.

The feature of an eleventh aspect of the invention for achieving the objects of the present invention is in providing a means for preventing the transfer of mist, which is generated with liquid spray by the spraying means, to the downstream region of the catalytic layer at the space.

The above first and second aspects of the inventions can prevent the organohalogen compound from generating corrosive substance with heating by the carrier gas, and destruction of the organohalogen compound can be performed with a preferable efficiency, because the organohalogen compound is added to the carrier gas which is previously heated by the heater and released from the heater. In order to destruct the organohalogen compound effectively with catalyst, it is necessary to elevate the temperature of the organohalogen compound higher than the reaction temperature of the catalyst with the organohalogen compound. However, if the temperature is excessively high, the organohalogen compound destructs to generate corrosive substance. Even if the temperature of the gas released from the heater is within a range in which generation of the corrosive substance is suppressed, the temperature inside the heater reaches locally the temperature at which the corrosive substance is generated. Accordingly, if the organohalogen compound is supplied into the heater, the organohalogen compound is destructed at a local region which is heated to an excessively high temperature to generate the corrosive substance. The carrier gas, which is heated by the heater and released from the heater, has substantially uniform temperature distribution and no local elevation of the temperature. Therefore, if the organohalogen compound is added into the carrier gas at downstream region of the heater, the destruction of the organohalogen compound with the local heating of the carrier gas can be suppressed.

In accordance with the present invention, the organohalogen compound which is the object of the treatment is a compound containing at least one of chlorine, fluorine, and bromine. Practically, the compound is one of an organochloro-compound, organofluoro-compound, and organobromo-compound. As the organochloro-compound, there are methylchloride, chloroform, carbon tetrachloride, ethylene chloride, 1,1,1-trichloroethane, 1,1,2-trichloroethane, 1,1,2,2-tetrachloroethane, hexachloroethane, vinyl chloride, vinylidene chloride, tetrachloroethylene, chlorobenzene, benzyl chloride, benzene hexachloride, ethylene glycol, trichloroethylene, and others. As the organofluoro-compound, there are CFC-11, CFC-12, CFC-13, CFC-14, CFC-15, HCFC-22, HCFC-141, HCFC-225, and others. As the organobromo-compound, there are Halon-1211, Halon-1301, Halon-2402, and others.

The organochloro-compound contains chlorine, and generates mainly corrosive gas (acidic) such as chlorine, hydrogen chloride, and the like by destruction. The organofluoro-compound contains fluorine, and generates mainly corrosive gas (acidic) such as fluorine, hydrogen fluoride, and the like by destruction. The organobromo-compound contains bromine, and generates mainly corrosive gas (acidic) such as bromine, hydrogen bromide, and the like by destruction.

As an example of the carrier gas for the organohalogen compound, air can be used. The carrier gas is used for introducing the organohalogen gas into the catalytic layer. Therefore, the carrier gas has to be inert chemically and thermally, and an inert gas such as nitrogen, argon, and the like can be used other than air. In economical view, air is preferably used as the carrier gas.

Further, as for the heater, any of electric heater and combustor can be used. However, in view of heating efficiency, the combustor is preferably used. As the carrier gas (especially, combustion air) is directly heated with heat generated by combustion of fuel in the combustor, the combustion efficiency is remarkably high. The temperature inside the combustor reaches a high temperature locally by combustion of fuel (when town gas is used for the fuel, the burning temperature reaches locally 1000° C.).

Flon-113, one of the organohalogen compounds, starts partly a destructing reaction when the temperature exceeds 700° C., and generates strongly corrosive gases such as HF, HCl, and the like. Therefore, the piping and other components for supplying the organohalogen compound to the catalytic layer must be composed of significantly anti-corrosive materials. However, in accordance with the first aspect of the invention, the materials having not so strong anti-corrosion property can be used as the construction material for the piping and other component.

The second aspect of the invention generates the following effect with the effect generated by the first aspect of the invention. The temperature of the carrier gas is lowered, because the heated carrier gas is mixed with steam before mixing the carrier gas and the organohalogen compound. Therefore, a probability to generated the corrosive substance with destruction of the organohalogen compound by heating decreases to lower than that of the first aspect of the invention The steam is used for supplying hydrogen and oxygen which are necessary for destructing the organohalogen compound with catalyst. For instance, when flon 113 is destructed by hydrolysis, the destruction reaction proceeds as follows;

$$C_2Cl_3F_3 + 3H_2O \rightarrow 3HCl + 3HF + CO_2 + CO$$

The amount of the steam necessary for the hydrolysis is 3 moles per 1 mole of flon 113. The amount of the steam is supplied approximately 1.0~2.0 times of an equivalent amount necessary for the destruction based on the kind and the amount of the organohalogen compound. The supplying amount of the steam is preferably controlled so as to be within the above range. Depending on the kind of the catalyst, the destruction is performed not by hydrolysis but by oxidation. In this case, as hydrogen is not necessary, supply of the steam is not necessary.

The third aspect of the invention facilitates control of the supplying amount of the organohalogen compound, because the organohalogen compound, which is liquid at room temperature, is added in a liquid condition to the carrier gas in addition to the effects generated by the first and second aspects of the inventions. The liquid organohalogen compound can be supplied quantitatively. When the organohalogen compound is in a gaseous condition, the control of the supplying amount becomes complex, because both volume and pressure must be controlled.

The third aspect of the invention is explained practically hereinafter. The organohalogen compound can be mixed in a gaseous condition with the carrier gas and steam. However, if the organohalogen compound is mixed in a liquid condition with the carrier gas and steam, the liquid organohalogen compound can be vaporized by sensible heat of the carrier gas and the steam, and accordingly, a facility for vaporization of the liquid organohalogen compound, which is usually provided separately, can be omitted. Furthermore, some of organohalogen compounds have respective boiling point which is close to room temperature. In this case, stable supply of the organohalogen compound is difficult, because the organohalogen compound is liquefied or vaporized depending on variation of the environmental temperature around the treating apparatus. As one of countermeasures against the above problem, a method for supplying the organohalogen compound in a gas condition or a liquid condition by controlling the temperature can be thought. However, the above method is not desirable, because a large amount of energy is necessary for controlling the temperature, and precise temperature management of the supply piping and other components are required.

The fourth aspect of the invention generates the same effect as the third aspect of the invention, because the organohalogen compound having a boiling point which is close to room temperature is pressurized and added in a liquid condition to the carrier gas. Practically, a stable supply and a stable flow rate measurement are realized by pressurizing inside the treating apparatus and maintaining the inside pressure from the treating apparatus to the outlet valve higher than a saturated pressure at the environmental temperature around the treating apparatus so as to keep this organohalogen compound in a liquid condition. However, the fourth aspect of the invention requires a more complex system than the third aspect of the invention, because an extra pressurizing apparatus is necessary.

The fifth aspect of the invention can decrease the amount of water (including steam) to be added to the carrier gas, i.e. the combustion gas, because hydrogen or hydrocarbon fuel is burnt in the heater, and the organohalogen compound is added to the combustion gas released from the heater. Therefore, a facility for supplying water can be simplified. When a combustor is used as the heater and hydrogen or hydrocarbon fuel is used as the fuel, steam is generated as a combustion product, and the steam can be utilized for the destruction reaction of the organohalogen compound at the catalytic layer. Naturally, the amount of water supplied externally can be decreased. Accordingly, the facility for supplying water can be simplified. As the hydrocarbon fuel, petroleum, petroleum group gas, alcohol fuel, natural gas, hydrogen, and others can be used. Sulfur component in the fuel has a possibility to shorten the life of the catalyst.

Therefore, use of hydrocarbon such as petroleum group gas as propane gas, alcohol fuel, hydrogen, and others, which includes no sulfur, is desirable.

Depending on the kind and the treating amount of the organohalogen compound, a total amount of steam necessary for its destructing reaction can be supplied by the steam generated by the combustion of the organohalogen compound.

For instance, when destructing one mole of flon 113, which is one of the organohalogen compounds, only three moles of steam is necessary. If one mole of propane, ($C_3H_8$), is used as the fuel which is burnt in the combustor, four moles of steam is generated by the combustion of the propane. Accordingly, it is not necessary to add additional water to the carrier gas supplied to the catalyst layer. The apparatus for treating organohalogen compounds used for the above treatment exclusively does not requires any water supply facility.

In accordance with the sixth aspect of the invention the destruction of the organohalogen compound which is added to carrier gas released from the heater can be prevented at an upstream region from the catalyst layer, in addition to realizing the effects claimed the first and fifth aspects of the invention, because the temperature of the carrier gas released from the heater is controlled to be higher than a temperature at which the organohalogen compound is destructed by the catalyst and lower than a temperature at which the organohalogen compound is destructed at least partially. Therefore, corrosion of the structural material at the upstream region from the catalyst layer can be prevented.

A practical example of the above advantages is explained hereinafter. When an organohalogen compound of low concentration is treated, the temperature of the carrier gas may be nearly the same as the temperature necessary for destructing the organohalogen compound with a catalyst layer. However, when an organohalogen compound of high concentration is treated, the temperature of the carrier gas before mixing with the organohalogen compound must be set higher than the temperature necessary for destructing Lithe organohalogen compound with a catalyst layer, because, the temperature of the carrier gas is decreased by mixing with the organohalogen compound. In the above case, the output power of the heater (for instance, the amount of the supplied fuel) is regulated so that the temperature of the carrier gas before being mixed with the organohalogen compound does not exceed the temperature for the partial destruction of the organohalogen compound, and the temperature of the carrier gas or a mixture of the carrier gas and steam is lower than the temperature for the partial destruction of the organohalogen compound and the temperature after being mixed with the organohalogen compound is higher than the temperature necessary for the destruction of the organohalogen compound by the catalyst layer. If the maximum usable temperature of the catalyst is lower than the temperature for the partial destruction of the organohalogen compound, the temperature must be regulated in a range lower than the maximum usable temperature of the catalyst layer.

In accordance with the seventh aspect of the invention corrosion by destructed gases generated by the destruction of the organohalogen compound with the catalyst layer can be prevented, in addition to realizing the advantages of claimed in the first and fifth aspects of the inventions, because the exhaust gas released from the catalyst layer is cooled down as soon as possible. When the organohalogen compound is destructed, strongly corrosive halogens and hydrogen halides such as chlorine, hydrogen chloride, fluorine, hydrogen fluoride, and the like corresponding to the kind of the organohalogen compound are generated at a high temperature. In order to resist against the above strongly corrosive gas of high temperature, heat resistant and corrosion resistant metals such as Ni. Ni—Cr alloys, and the like, and heat resistant and corrosion resistant materials such ceramic coating, glass coating must be sued as structural materials of the apparatus. However, in accordance with the present invention, the corrosion environment at downstream region of the catalyst layer in the apparatus can be moderated by cooling down the exhaust gas released from the catalyst layer as soon as possible. For instance, if the temperature of the exhaust gas is decreased below 150° C., fluorine resins other than the above inorganic materials can be used. If the temperature of the exhaust gas is decreased below 100° C., vinyl chloride resins coated on the structural material can be used.

As a means for cooling the exhaust gas released from the catalyst layer, there are, for example, a method of installing a heat exchanger in the downstream region form the catalyst container, a method of cooling with washing liquid in a washer which is installed in the downstream region of the catalyst container, a method of cooling with bubbling in a liquid tank which is installed in the downstream region of the catalyst container, and a method of cooling with spraying in the downstream region of the catalyst container, etc. As a means for minimizing the range of strong corrosive environment and suppressing a head loss of the exhaust gas low, the method of cooling with spraying in the downstream region of the catalyst layer in the catalyst container is preferable. For the spraying liquid, a chemically stable liquid such as water is used. Further moderation of the corrosive environment can be realized by adding an alkali agent into the spraying liquid in order to neutralize partially the halogen and the hydrogen halide. As a dry process, a method for cooling by supplying cooled air into the exhaust gas at downstream region of the catalyst layer can be used.

In accordance with the eighth aspect of the invention generation of poisonous gas from the destructed gases which are generated by the destruction of the organohalogen compound can be prevented, in addition to achieving the advantages claimed in the first and fifth aspects of the invention, by cooling down the exhaust gas released from the catalyst layer as soon as possible because the organohalogen compound is a gas containing chlorine. For instance, the chlorine generated by the destruction of the organohalogen compound containing chlorine yields poisonous organochloro-compounds (dioxine and the like) by reacting with unburned components in the combustion gas after being maintained at a temperature approximately 300° C. The generation of the poisonous organochloro-compound can be prevented by cooling down the exhaust gas released from the catalyst layer as soon as possible.

In accordance with the ninth aspect of the invention, a reactive material with acidic gases contained in the exhaust gas released from the catalyst layer is added into the exhaust gas released from the catalyst layer. Therefore, the acidic gas can be eliminated from the exhaust gas by reacting with the reactive material, in addition to achieving the advantages claimed in first and fifth aspects of the invention. Accordingly, the corrosive environment at downstream region of the catalyst layer can be improved. As the reactive material with the acidic gas, for instance, alkaline solution, slaked lime, and the like can be used. Even in a case using the alkaline solution, either of a method of spraying the alkaline solution into the exhaust gas and a method of bubbling the exhaust gas into the stored alkaline solution can be used. In accordance with the former method, a large surface area of the alkaline solution can be utilized, and accordingly, a large efficiency of the reaction with the acidic gas can be realized. Therefore, the facility for treating the exhaust gas can be made compact. In accordance with the latter method, the head loss of the exhaust gas system is increased, and a salt, which is a reaction product of the acidic gas and the alkali, is precipitated, grown, and adhered onto a wall of the structural material at a low temperature region. The adhered material has a possibility to choke the piping of the treating system. The former method does not have such a problem, because the alkaline solution always flows.

In accordance with the tenth aspect of the invention, mist does not enter into the catalyst layer, and therefore, corrosion of the structural material of the catalyst layer can be suppressed, in addition to achieving the advantage claimed in the seventh aspect of the invention, because a means for protecting the catalyst layer from entering the mist which is generated by the spraying the liquid from the means for spraying the liquid is provided. Practically, when the liquid is sprayed at downstream region of the catalyst layer in the catalyst container containing the catalyst layer, splash of the sprayed liquid enters into the catalyst layer, and causes a possibility to decrease the temperature of the catalyst, and to decrease the activity of the catalyst. In accordance with installing a means for protecting the catalyst layer from entering the mist, the above problem can be suppressed. The means for protecting the catalyst layer from entering the mist can be realized, for instance, by installing a baffle plate at an interval between the catalyst layer and the spraying space.

In accordance with the eleventh aspect of the invention, an amount of splash which migrates into the downstream region of the catalyst layer can be decreased, in addition to achieving the advantage claimed in the seventh aspect of the invention, because a means for preventing the mist, which is generated by the spraying the liquid from the means for spraying, from migrating into the downstream region is provided in a space at the downstream side exit of the catalyst layer. The above effect causes an advantage to improve an efficiency of eliminating acidic gas in the exhaust gas released from the catalyst layer. Practically, the splash of the sprayed liquid migrates into the piping which connects the chamber having the catalyst layer and an apparatus for treating the exhaust gas installed in the downstream region of the catalyst layer, and the migrated splash generates a new corrosion source by bringing humidity into the piping, inside of which must be naturally in a dried condition. The means for preventing the mist from migration can be realized, for instance, by providing a separating chamber, in which the gas velocity is slow, in the vessel containing the catalyst in order to settle down the mist in the air.

In a practical example of the present invention, the exhaust gas generated by the destruction of organohalogen compound is cooled down or neutralized partially in a vessel containing the catalyst, and subsequently, the halogen and the halogen compound are completely eliminated from the exhaust gas by an apparatus for treating the exhaust gas. A trace of undestructed organohalogen compound is contained in the exhaust gas released from the apparatus for treating the exhaust gas. However, the treated exhaust gas can be released without any further treatment or requires further re-treatment depending on the kind and the content of the undestructed component of the organohalogen compound.

If further treatment is necessary, the gas is adsorbed once by an adsorbent at the downstream region of the apparatus for treating the exhaust gas, and re-treating the gas which is re-generated and released from the adsorbent is generally performed. As the adsorbent, active carbon, zeolite, silica gel, active alumina, and the like are used. Practically, the treatment of the recovered and released organohalogen compound is performed continuously without stopping the destruction treatment of organohalogen compound by providing two systems of the adsorbing columns in parallel, recovering the one system while the other system is under operation, and introducing the recovered and released organohalogen compound into the catalyst under operation.

Steam can be heated by mixing with heated air, or by direct heating. However, if the organohalogen compound contacts with flame, a heating body, and a body at an elevated temperature higher than the destruction temperature of the organohalogen compound in the heater, the organohalogen compound destructs partially even if the heating temperature is below the destruction temperature, and the organohalogen compound has a possibility to generate corrosive materials as destruction products. Therefore, the direct heating by the heater is not desirable. In the above case, it is necessary to elevate the temperature of the steam to the necessary temperature for catalytic destruction by mixing the steam with previously heated carrier gas such as air, or a mixture of the carrier gas and steam.

BRIEF DESCRIPTION OF THE DRAWINGS

These and other objects, features, and advantages of the present invention will be understood more clearly from the following detailed description with reference to the accompanying drawings, wherein.

DESCRIPTION OF THE PREFERRED EMBODIMENTS

Embodiment 1

Figure 1:
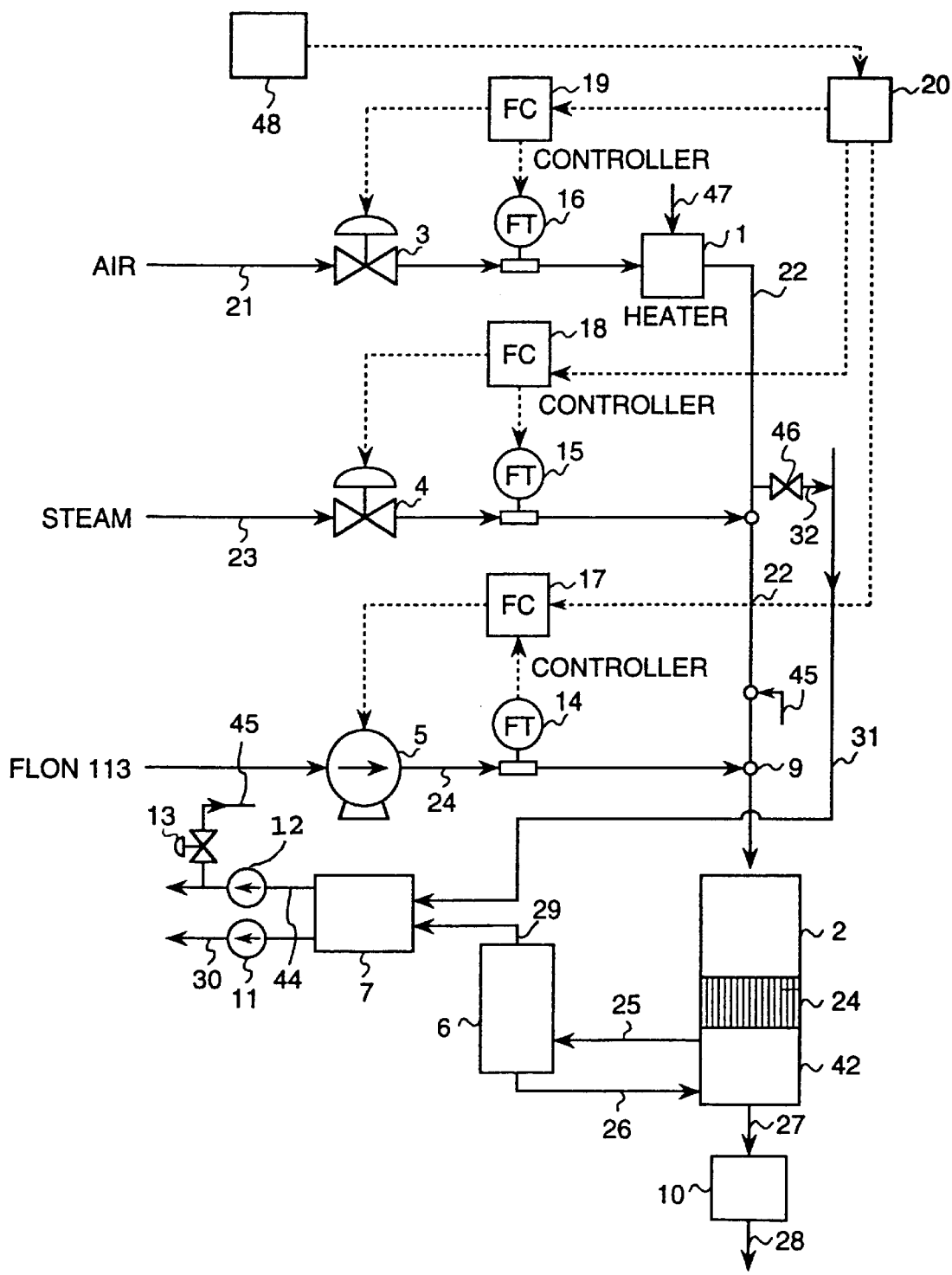
FIG. 1 schematically illustrates a construction of an apparatus for treating an organohalogen compound, which is one of the preferred embodiments of the present invention.

An apparatus for treating an organohalogen compound, which is one of the preferred embodiments of the present invention, is explained referring to FIGS. 1, 2, and 3 hereinafter.

Taking flon 113 as an example of the organohalogen compound, a treatment procedure in the present embodiment is explained.

The piping 21 for introducing air as a carrier gas is connected to the heater 1, which is a combustor, via the flow rate control valve 3. The flowmeter 16 (for air flow rate measurement) is provided to the piping 21. The heater is connected to the catalyst container 2 by the piping 22. The catalyst container contains inside a catalyst layer 24. The catalyst employed is made of titanium oxide-tungsten oxide. In order to destruct flon 113 more than 99.9%, the temperature of the catalyst must be maintained at least at 400° C. The piping 23 for introducing steam is connected to the piping 22 at the downstream region of the heater 1 via the flow rate regulator 4. A steam supplying position 8 is the above connected position. The flowmeter 15 (for steam flow rate measurement) is provided to the piping. The piping 24 for introducing flon 113 is connected to the piping 22 at the downstream region of the steam supplying position 8 via the pump. A flon supplying position 9 is the above connected position. The flowmeter 14 (for flon 113 flow rate measurement) is provided to the piping.

The cooling space 42 located at the downstream region of the catalyst layer 24 in the catalyst container 2 is connected to the exhaust gas treating apparatus 6 by the piping 25. The lower region inside the exhaust gas treating apparatus 6 is connected to the cooling space 42 by the piping 26. The exhaust gas treating apparatus 6 is connected to the entrance region of the apparatus for adsorbing organohalogen compound 7 by the piping 29. The piping 31 for introducing air for desorption is connected to the entrance region of the apparatus for adsorbing organohalogen compound 7. The piping 32 provided with the valve 46 is connected to the piping 22 at a position between the heater 1 and the steam supplying position 8, and to the piping 31. The piping 30 provided with the exhauster 11 is connected to the outlet region of the apparatus for adsorbing organohalogen compound 7. The piping 44 provided with the exhauster 12 is also connected to the outlet region of the apparatus for adsorbing organohalogen compound 7. The piping 45 connected to a piping at the downstream region of the exhauster 12 is connected to the piping 22 at a position between the steam supplying position 8 and the flon 113 supplying position 9. The piping 45 is provided with the open/close valve 13.

The regulating apparatus in the present embodiment is explained hereinafter. The main controller 20 outputs corresponding control signals to respective of the controllers 17, 18, and 19. The controller 19 regulates the opening of the flow rate control valve 3. The controller 18 regulates the opening of the flow rate control valve 4. The controller 17 regulates the number of rotation of the pump 5.

The heater 1 is installed at the upstream region of the flon supplying position 9, because the heater has a high heating efficiency with a high operating temperature, and accordingly, the size of the heater can be decreased, and inside the heater 1 reaches a high temperature locally which is same as the flame. The flon 113 does not pass through the heater 1, but the flon 113 is heated to a desired temperature by being mixed with heated air. In accordance with the above method, the flon 113 can be heated to 430° C., which is a necessary temperature for catalytic destruction of the flon 113, while preventing the flon 113 from local destruction.

Air is supplied to the heater 1 with a flow rate of approximately 260 Nm³/h regulated by the flow rate control valve 3. Propane is supplied to the heater 1 inside as fuel for combustion through the fuel supply piping 47. A part of the above air is used as air for the combustion. The air is heated to about 600° C. by combustion of the propane. The heated air is supplied to the catalyst container 2 through the piping 22. The gas released from the heater 1 is combustion gas. In the above case, only the air necessary for combustion of the propane might be supplied to the heater 1 and the rest of the air is supplied to the piping 22 directly by bypassing the heater 1. Steam is generated by the combustion of the propane. The heated air in the piping 22 contains about 10 kg/h of steam generated by the combustion. The steam can be utilized as the steam necessary for catalytic destruction of the flon 113.

However, the amount of steam generated by only the combustion of the propane is not sufficient for catalytic destruction of flon 113. Therefore, steam at 100° C. with a flow rate regulated by the flow rate control valve 4 is supplied to the piping 22 at the steam supplying position 8 through the piping 23, and mixed with the heated air. When the amount of the flon 113, the object of the destruction, is small, the amount of steam necessary for the catalytic destruction of the flon 113 can be satisfied with only the steam generated by the combustion of the propane. A water vaporizer (not shown in the figure) can be installed at the steam supplying position 8 in order to mix sufficiently the steam supplied through the piping 23 and the heated air. The water vaporizer is filled with metal meshes and others in order to increase contacting area of the steam and the air so as to increase a rate of heat exchange. The water vaporizer is not necessary when the heated air is at a high temperature and has a large flow rate sufficient for maintaining necessary amount of heat for evaporation.

The flon is pressurized by the pump 5, and supplied to the piping 22 at the flon 113 supplying position 9 through the piping 24. The liquified flon 113 is supplied at the rate of 50 kg/h by the supplying pump 5. The flon 113 is mixed with the heated air and the steam at the flon supplying position 9. The flon is vaporized by the sensible heat of the air and the steam, and mixed homogeneously. The flon 113 is supplied to the inside of the piping 22 by spraying in order to perform heat exchange rapidly with the heated air and the steam. In order to improve the vaporization efficiency of the flon, a flon vaporizer (not shown in the figure) might be installed at the flon 113 supplying position 9. The flon vaporizer is filled with metal meshes and others in order to enhance the contact of the flon 113 with the heated air and others.

The steam supplying position 8 is desirably located at the same position as the flon supplying position 9, or, if it may be possible, at the upstream region of the flon supplying position 9. Because, in order to decrease a possibility to destruct the flon 113 locally by heating, the heated air at a high temperature is prevented from contacting directly the flon 113 by supplying the flon at a position where the heated air and the steam are mixed and the temperature of the mixture is slightly decreased. Water might be supplied instead of the steam. However, in this case, the water is desirably supplied by spraying in order to perform the heat exchange with the heated air rapidly.

As explained above, a mixed gas of heated air, steam, and flon 113 at about 430° C. is generated, and the mixed gas is supplied to the catalyst container 2.

In order to destruct the flon 113 effectively at the catalyst layer 24 in the catalyst container 2, the mixed gas must be adjusted to a condition suitable for the destruction treatment. Therefore, the supplying amount of the respective air, steam, and flon 113 must be regulated to be a desirable condition, and then, the air, the steam, and the flon 113 are supplied.

A supplying method of the organohalogen compound to the downstream region of the heater 1 has been explained hitherto taking the flon 113 as an example.

However, the boiling point of an organohalogen compound varies depending on the kind of the organohalogen compounds. For instance, when treating the organohalogen compound having a boiling point near room temperature of about 20° C. as flon 113, the organohalogen compound is desirably supplied by maintaining either one condition of gas or liquid in order to regulate the supplying amount of the organohalogen compound adequately. The supply of gaseous organohalogen compound necessitates to evaporate the organohalogen compound by providing a separate heater to the piping 22, and regulating the heating at above the boiling point. Therefore, the composition of the treating apparatus becomes large and complex. On the contrary, when the organohalogen compound having a low boiling point is supplied in a liquid condition, there are two methods, such as a method wherein the organohalogen compound is supplied with cooling down below its boiling point and a method wherein the organohalogen compound is supplied under an operating pressure exceeding its saturated vapor pressure. In the case of the cooling method, objects of the cooling are ranged wide because storage tanks and supplying piping of the organohalogen compound must be cooled down. In the case of the pressurizing method, there are several advantages such that the heating and cooling facilities are not necessary. Further, because the saturated vapor pressure of flon 113 at room temperature is as low as approximately 1 kg/cm$^2$, a range to be pressurized is not the whole treating facility, but only from storage tanks to supplying piping of the organohalogen compound, and the impact of pressurizing procedure to the facility is small. In accordance with the above consideration, the supply of the organohalogen compound having a boiling point near room temperature is desirably performed by the method wherein the organohalogen compound is pressurized exceeding its saturated vapor pressure and supplied in a liquid condition.

On the other hand, in the case of the organohalogen compound having a low boiling point of −30° C. such as flon 113, the method for supplying the organohalogen compound at the downstream region of the heater 1 requires a pressure resistance facility, because the operating pressure for supplying the flon 113 in a liquid condition by pressurizing the flon 113 over its saturated vapor pressure becomes as high as approximately 10 kg/cm$^2$. Therefore, the organohalogen compound having a lower boiling point than room temperature is desirably controlled and supplied in a gaseous condition.

As explained above, a mixed gas of heated air, steam, and flon 113 at a temperature suitable for catalytic destruction can be supplied to the catalyst container 2, and the flon 113 can be destructed.

In the present embodiment, the flon 113 is added to the heated air at the downstream region of the heater 1. Accordingly, the temperature of the heated air is not elevated locally, and no local destruction of the flon 113 occurs. Therefore, corrosion of the piping 22 can be suppressed. Particularly, as the flon 113 is added to the heated air at the downstream region of the heater 1, the temperature of the heated air becomes lower than the destruction temperature of the flon 113. Therefore, corrosion of the piping 22 can be remarkably suppressed. The combustion of propane, i.e. a hydrocarbon, generates steam, and the amount of steam (or liquid water) to be added externally into the piping 22 can be decreased. Therefore, the size of the steam supplying system, that is, a diametral size of the piping 23 and a size of flow rate control valve 3 can be decreased, and the steam supplying system can be made compact.

Control of the supplying flow rate of the air, steam, and flon 113 is explained hereinafter.

The supplying amount of air, i.e. a carrier gas, depends on the supplying amount and concentration of the organohalogen compound, and the supplying amount of steam depends on the treating amount of the organqhalogen compound. Accordingly, concentration of the mixed gas can be controlled by setting the treating amount of the organohalogen compound and a rate of steam addition, and giving the concentration setting of the organohalogen compound in the mixed gas as a condition for the carrier gas supplying amount control.

An operator inputs data such as the kind of the supplied organohalogen compound (characteristics such as specific gravity and others are set), and the treating condition (the treating amount of the organohalogen compound, the ratio of the amounts of the steam and the organohalogen compound, and the concentration of the organohalogen compound in the mixed gas) into the main controller 20 from the input apparatus (keyboard etc.) 48. The main controller 20 calculates the supplying amounts of flon 113, steam, and air based on the input information. The main controller 20 outputs the calculated supplying amount of the organohalogen compound (in the present example, flon 113), of which the kind is designated by the input apparatus 48, to the controller 17, the calculated supplying amount of steam to the controller 18, and the calculated supplying amount of air to the controller 19, respectively, as a setting value.

The supplying amount of air, i.e. a carrier gas, is controlled by regulating the opening of the flow rate control valve 3 by the controller 19 based on the above setting value using the flow rate of the air determined by the flowmeter 16 as a feed back signal. The supplying amount of steam is controlled by regulating the opening of the flow rate control valve 4 by the controller 18 based on the above setting value using the flow rate of the air determined by the flowmeter 15 as a feed back signal. The supplying amount of flon 113 is controlled by regulating the rotation speed of the pump 5 by the controller 17 based on the above setting value using the flow rate of the air determined by the flowmeter 14 as a feed back signal.

Respective of the setting values of the controllers 17, 18, and 19 can be varied depending on the calculation by the main controller 20. By making the setting values variable as described above, respective of the flow rate control valves has a possibility to cause hunting. Therefore, when the flow rate controlling becomes stable in a certain range, the corresponding controller for controlling the flow rate must have a function to set a condition for accepting a setting value.

In accordance with the present embodiment, the amount of the organohalogen compound to be treated, the amount of the steam, and the amount of the carrier gas can be controlled for composing the mixed gas having an optimum concentration of respective gases for catalytic destruction of flon 113.

The structure of the catalyst container 2 used in the present embodiment is explained hereinafter referring to FIG. 2.

The catalyst container 2 comprises a porous plate 33 which is fixed inside the chamber by welding. The porous plate 33 has a plurality of pores which enable liquid pass through. A catalyst layer 24, which is filled with the catalyst, is provided on the porous plate 33. The catalyst layer 24 is arranged inside the catalyst container 2. The catalyst container 2 is provided with the inlet hole 34 for filling the catalyst and the outlet hole 35 for taking out the catalyst. The inlet hole 34 and the outlet hole 35 are closed by the closing plates 36A and 36B, respectively, during the mixed gas flows. In a case when pre-fabricated catalyst (for instance. Honey-comb shaped catalyst) is used, it is possible to facilitate the operation of the loading and unloading of the honey-comb shaped catalyst by using a catalyst container 2 which is separable into two parts, i.e. an upper part and a lower part. A baffle plate 38 for dispersing a stream of the mixed gas is provided at the upper portion of the catalyst layer 24, particularly in the vicinity of the opening of the piping 22, in the catalyst container 32. The baffle plate 38 is fixed to the catalyst container 38 by welding or the like. An enlarged cooling chamber 39 is provided which is connected to the lower portion or bottom of the catalyst container 2 as shown in FIG. 2. A cooling space 42 is formed in the cooling chamber 39. One or plurality of spray nozzles 40 are provided in the cooling chamber 39. The spray nozzles 40 are so arranged that cooling water can be sprayed to the whole space in the cooling space 42. The cooling chamber 39 forms inside a separating chamber 43 in addition to the cooling space 42. The cooling chamber 42 and the separating chamber 43 are connected mutually at a lower portion, and divided by a partition plate 44 which is provided in the cooling chamber 39. The piping 25 is connected to the upper portion of the separating chamber 43, and the piping 26 is connected to the lower portion of the separating chamber 43, respectively. The size of the separating chamber 43 is decided so that the flow velocity of the fluid becomes sufficiently slow, particularly, for preventing entrainment of mist in the fluid. The cooling chamber 39 has a bottom 49 declined toward the piping 27 in order to facilitate drainage of the cooling water sprayed from the spray nozzles 40. The baffle plate 37 is provided near the outlet of the catalyst layer 24 in the cooling space 42, and fixed to the cooling chamber 39 by welding. The baffle plate 37 prevents the water sprayed from the spray nozzles 40 from entering into the catalyst layer 24. The catalyst container 2, porous plate 33, inlet hole 34, outlet hole 35, closing plate 36, and baffle plate 37 are made of heat resistant steel, such as a Ni—Cr alloy, which has preferable corrosion resistance against chlorine and hydrogen chloride generated by the catalytic destruction of flon 113 at a high temperature.

The mixed gas containing flon 113 flows into the catalyst container 2 through the piping 22. The mixed gas collides with the baffle plate 38, and a stream of the mixed gas is dispersed. The stream of the mixed gas reaches the upper plane of the catalyst layer 24 uniformly, and passes through the catalyst layer 24. During passing through the catalyst layer 24, flon 113 is destructed by the effect of the catalyst. Chlorine and hydrogen chloride are generated by the destruction of flon 113. The above products are at a high temperature, and significantly corrosive. The catalyst container 2 including the cooling chamber 39, and the structural members in the cooling chamber 39 are composed of a heat resistant steel, such as a Ni—Cr alloy, having preferable corrosion resistance against the corrosive gas.

The exhaust gas released from the catalyst layer 24 reaches the cooling space 42. The exhaust gas is cooled down rapidly by cooling water which is sprayed in the cooling space 42. The rapid cooling prevents the exhaust gas from being maintained at approximately 300° C. whereat dioxin, an extremely poisonous gas, is generated. That means, generation of dioxin in the exhaust gas can be prevented. It is well known that, if a gas containing chlorine or chlorine compounds is cooled down slowly at approximately 300° C., dioxin is generated. The rapid cooling by the water spray explained above is effective for preventing the generation of dioxin.

In the cooling space 42, sprayed water splashes all over the space. The baffle plate 37 prevents the splashed water from entering into the catalyst layer 24. Accordingly, the temperature inside the catalyst layer 24 can be maintained at a desirable temperature, and a preferable destruction efficiency for flon 113 can be maintained.

Some of the sprayed water drops are entrained with the exhaust gas ascending in the separating chamber 43 toward the piping 25. However, as the separating chamber 43 has a sufficiently large space, the ascending velocity of the sprayed water drops are decreased, and the sprayed water drops are naturally dropped by the effect of gravity and separated from stream of the exhaust gas. As explained above, the humidity in the exhaust gas flowed into the piping 25 can be restricted. Accordingly, the corrosive condition for piping and apparatus, such as the piping 25, the exhaust gas treating apparatus 6, and others, can be moderated.

Chlorine and hydrogen chloride which are generated by the catalytic destruction of flon 113 can be neutralized by adding an alkaline agent such as sodium hydroxide to the cooling water sprayed from the spray nozzles 40. When an organofluoro-compound is treated instead of flon, fluorine and hydrogen fluoride generated by the catalytic destruction can be neutralized. Accordingly, corrosive property of the exhaust gas released from the catalyst layer 24 can be moderated. In this case, the structural members can be composed of materials which are generally used. For instance, the cooling chamber 39 and others can be made of stainless steel or carbon steel lined with teflon, porcelain, bricks, and others.

On the bottom of the cooling chamber 39, a mixture of sprayed cooling water, chlorine compounds generated by the neutralization, and waste water in a slurry condition is accumulated. However, the mixture can be drained readily to the piping 27 by the declined bottom plate 49. The mixture is treated at the waste water treating apparatus 10 for being made harmless, and then, released to outside the system through the piping 28.

The exhaust gas entered the piping 25 is introduced into the exhaust gas treating apparatus 6. An alkaline solution is supplied to the exhaust gas treating apparatus 6 through the inlet line 41. The alkaline solution descends inside of the exhaust gas treating apparatus 6 contacting with the exhaust gas. The alkaline solution absorbs acidic gases (chlorine gas, hydrogen chloride gas) in the exhaust gas to eliminate the acidic gases from the exhaust gas. Therefore, corrosion of the organohalogen compound adsorbing apparatus 7 located at the downstream region of the exhaust gas treating apparatus 6 can be prevented. The alkaline solution which as absorbed the acidic gases is introduced into the cooling chamber 39 through the piping 26. The alkaline solution is released to the piping 27 with the cooling water sprayed from the spray nozzles 40.

Detailed structure of the organohalogen compound adsorbing apparatus 7 is explained hereinafter referring to FIG. 3. The organohalogen compound adsorbing apparatus 7 comprises adsorption towers 50, 51 which are filled with active carbon, open/close valves 52A, 52B, 53A, 53B, 54A, 54B, 55A, and 55B. The piping 29 is connected to the adsorption tower 50 via the open/close valve 52A, and to the adsorption tower 51 via the open/close valve 54A. The piping 31 is connected to the adsorption tower 50 via the open/close valve 53A, and to the adsorption tower 51 via the open/close valve 55A. The piping 30 is connected to the adsorption tower 50 via the open/close valve 52B, and to the adsorption tower 51 via the open/close valve 54B. The piping 44 is connected to the adsorption tower 50 via the open/close valve 53B, and to the adsorption tower 51 via the open/close valve 55B. The open/close valve 56 is provided to the piping 44 in the downstream region of the connecting point with the piping 45.

The organohalogen compound adsorbing apparatus 7 adsorbs undestructed flon 113 contained in the exhaust gas with the adsorption tower 50 (or the adsorption tower 51). The adsorption towers 50 and 51 repeat adsorption and desorption alternately by switching operation of the open/close valves. In FIG. 3, the open/close valves, of which marks are painted, are in a closed condition. The open/close valves, of which marks are not painted, are in an open condition. In FIG. 3, the adsorption tower 50 is in the adsorbing condition, and the adsorption tower 51 is in the recovering condition.

A small amount of undestructed flon 113 contained in the exhaust gas which is released from the exhaust gas treating apparatus 6 is adsorbed by the adsorption tower 50. The exhaust gas, of which undestructed flon 113 has been eliminated, is released outside through the piping 30 by operation of the exhauster 11.

A part of the heated air released from the heater 1 enters the piping 31 via the valve 46, and heats the air in the piping 31 to approximately 100° C. The heated air is introduced into the adsorption tower 51 for desorbing the undestructed flon 113 which has been adsorbed by the active carbon, and supplied to the piping 22 via the piping 44 and 45. The undestructed flon 113 is introduced into the catalyst layer again for destruction. Because a part of the heated air released from the heater 1 is used for heating the air for desorption, another heater for heating the air for desorption is not necessary. Therefore, the system composition can be simplified.

After operating the apparatus for a designated period, the open/close valves are operated for switching the adsorbing operation from the adsorption tower 50 to the adsorption tower 51. The exhaust gas released from the exhaust gas treating apparatus 6 is introduced into the adsorption tower 51, and released outside through the piping 30. The air heated at approximately 100° C. is supplied to the adsorption tower 50 through the piping 31. The undestructed flon 113 desorbed from the active carbon is introduced into the catalyst layer 24 as same as the above described operation. A returning position of the heated air for desorption is preferably at the downstream region from the heater 1, if possible, at the downstream region from the steam supplying position and the upstream region from the catalyst container 2, because generation of corrosive gases by local destruction of retraining undestructed flon 113 by heating must be prevented.

After desorbing the undestructed flon 113 and recovering the active carbon by supplying heated air to the adsorption tower 50 for a designated period, the supply of the heated air is stopped by closing the flow rate control valve 46, and only air at a low temperature is supplied to the adsorption tower 50 through the piping 31. The air is exhausted outside via the exhauster 12 and the open/close valve 56. At this time, the open/close valve 56 is open, and the valve 13 is closed. The air at a low temperature cools inside of the adsorption tower after the desorption for preparing subsequent adsorption. In accordance with the above method for desorption and recovery, the operation for recovering and desorbing the adsorption tower and destructing the desorbed flon can be performed without stopping the operation for destructing flon, the main object for the treatment, (hereinafter, it is called "a main destructing operation"). Therefore, the operation efficiency of the organohalogen compound treating apparatus can be improved.

In accordance with providing the adsorption tower in the exhaust gas piping line, the release of the undestructed flon can be decreased significantly, and the destruction efficiency of the total system can be improved remarkably. In accordance with providing two adsorption towers and performing the adsorption and recovery operation alternately using the adsorption towers 50, 51, the adsorption, recovery, and desorption of flon 113 can be performed continuously. Furthermore, load fluctuation at the catalyst container 2 can be flattened and stable operations of the apparatus become possible, because the amounts of the recovered gas and the desorbed gas become approximately constant by performing the operation for recovering the adsorption tower and destructing the desorbed flon without stopping the main destructing operation, and the operation for recovering and desorbing the adsorption towers 50, 51 continuously.

The present embodiment has been explained taking flon 113 as an example. However, the present embodiment can be applied to the destruction treatment of other organohalogen compounds such as organochloro compounds, organofluoro-compounds, organobromo-compounds, and the like. The other embodiments explained later are applicable as same as the present embodiment.

In the present embodiment, a quantitative supply pump can be used as the pump 5 shown in FIG. 1.

In the present embodiment shown in FIG. 1, flon 113 in a liquid condition was supplied to the piping 22. However, if the apparatus is aimed at treating exclusively flon 22, which has a low boiling point such as −40° C., the flon 22 filled in a cylinder can be supplied in a gaseous condition to the supply position 9. In this case, the pump 5 in FIG. 1 must be replaced with a flow rate control valve. The controller 17 regulates the opening of the above flow rate control valve based on the preset supplying amount of the flon 22 (calculated by the main controller 20).

Embodiment 2

Figure 4:
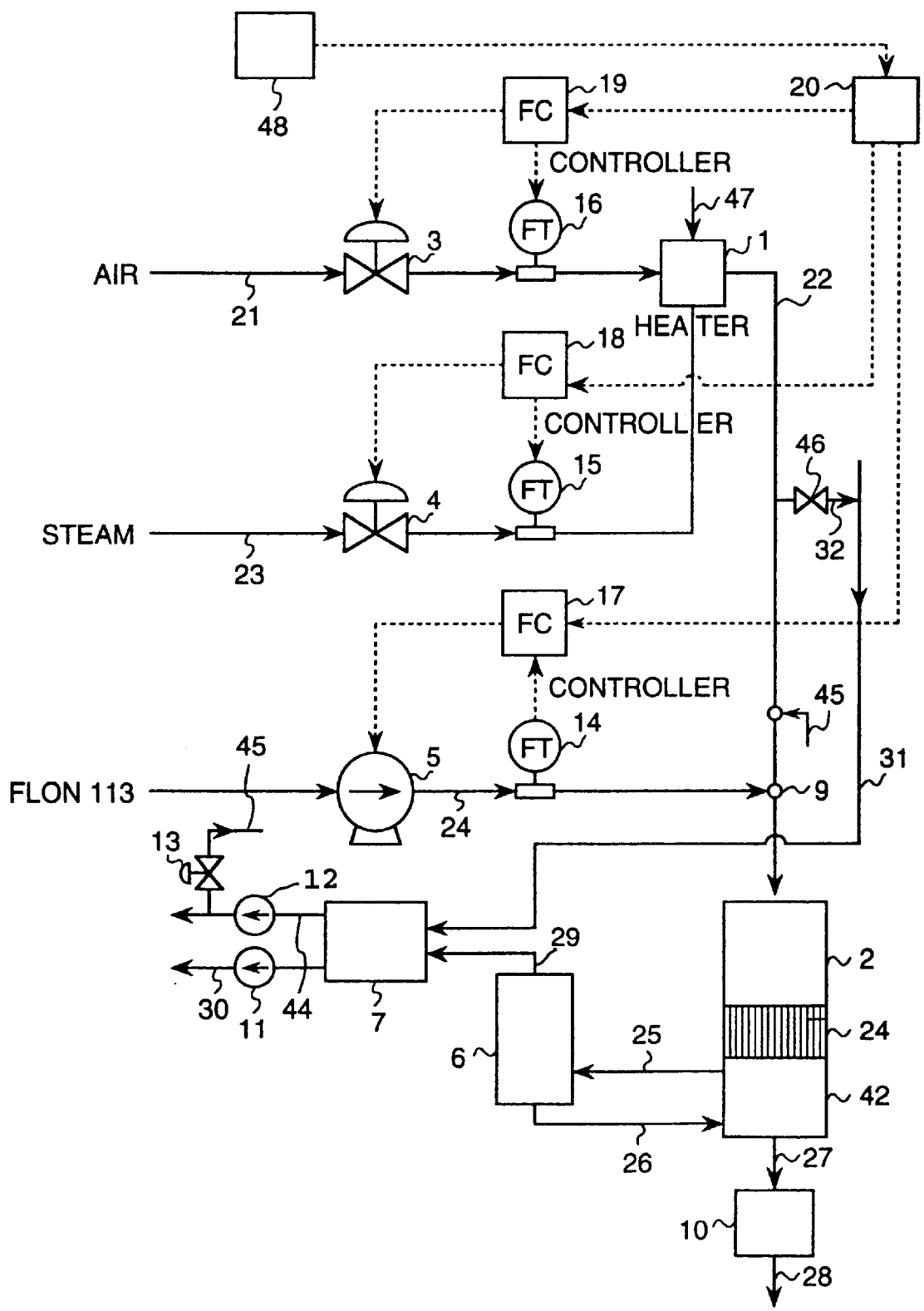

An apparatus for treating organohalogen compound, which is another embodiment of the present invention, is explained referring to FIG. 4 hereinafter. In the present embodiment, the piping 23 shown in FIG. 1 of the embodiment 1 is connected not to the piping 22 but to the heater 1. Other composition of the present embodiment is the same as the embodiment 1.

Steam is supplied to the heater 1 by the piping 23. As the temperature of the inside of the heater 1 is high, thermal energy for elevating temperature is readily obtained. Further, as the combustion gas flows an the inside of the heater 1, mixing of the steam and air, a carrier gas, can be enhanced. No evaporator is necessary. Furthermore, as the supply of the steam at 100° C. to the inside of the heater 1 decreases the temperature of the inside of the heater 1, heat resistance necessary for the heater 1 can be moderated. That means, if the air in the heater 1 is heated at 800° C. and subsequently the temperature of the heated air is decreased to 600° C. at the steam supplying position 8 by supplying the steam in the case of embodiment 1 shown in FIG. 1, the temperature of the inside of the heater 1 itself can be decreased to 600° C. by supplying the steam directly to the heater 1 such as in the present embodiment. Therefore, heat resistance necessary for the structural material of the heater 1 can be moderated in addition to the advantages obtained by the embodiment 1.

Embodiment 3

The composition of the present embodiment is the same as the embodiment 1 except a point that the flow rate control valve 4 is replaced with a pump in order to supply water to the piping 22 from the piping 23. The controller 18 regulates the rotation speed of the pump based on the preset supplying amount of water (calculated by the main controller 20). The other composition of the present embodiment is as same as the embodiment 1. In accordance with the present embodiment, the steam generator which is necessary in the embodiment 1 becomes unnecessary, and simplification of the apparatus can be achieved. However, as the water and the heated air are not mixed sufficiently in the piping 22, the water must be supplied by spraying into the piping 22, or through an evaporator. The present embodiment realizes the same advantages as the embodiment 1 except the point described above.

In the present embodiment, supplying water directly to the heater 1 by connecting the piping 23 to the heater 1 as same as the embodiment 2 is possible. In the above case, the evaporator and others become unnecessary in comparison with the case when the water is supplied to the piping 22.

Embodiment 4

Figure 5:
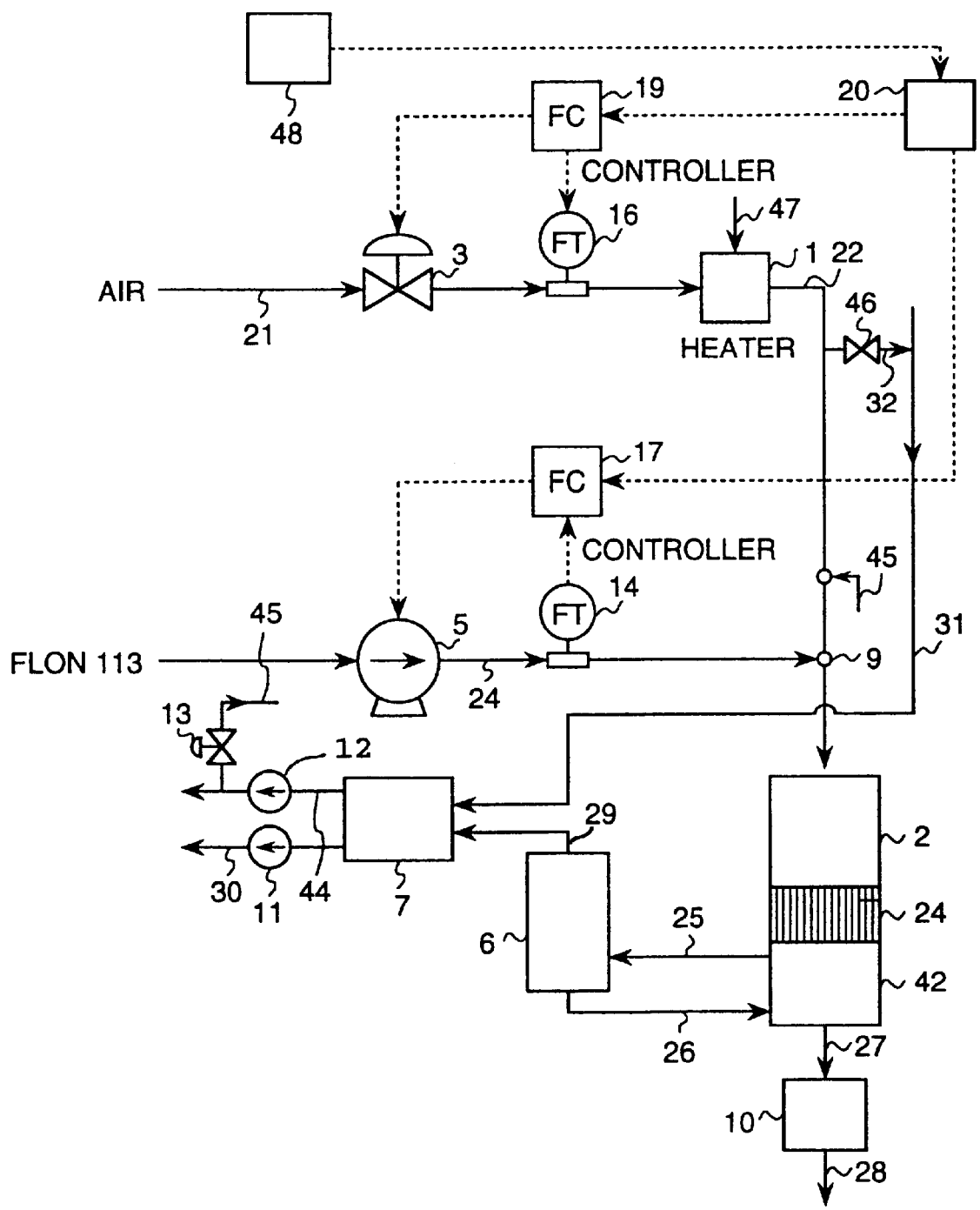

An apparatus for treating organohalogen compound, which is another embodiment of the present invention, is explained referring to FIG. 5 hereinafter. The present embodiment has a composition as same as the embodiment 1 except a point that the flow rate control valve 4, the flowmeter 15, the controller 18, and the piping 23 are eliminated from the composition of the embodiment 1. In accordance with the present embodiment, a total amount of steam necessary for destruction of flon 113 in the catalyst container 2 is supplied by combustion of hydrocarbon fuel such as propane in the heater 1. The supplying amount of the propane from the fuel supply piping 47 must be sufficient for supplying the total amount of steam necessary for the destruction of flon 113.

For instance, as shown by the following reaction formula (Equation 1), 4 moles H$_2$O is generated by combustion of one mole of propane (C$_3$H$_8$). In order to destruct one mole of flon 113 (C$_2$Cl$_3$F$_3$) using catalyst, 3 moles H$_2$O is necessary as the reaction formula (Equation 2) indicates.

$$C_3H_8 + 5O_2 \rightarrow 3CO_2 + 4H_2O \quad \text{(Equation 1)}$$

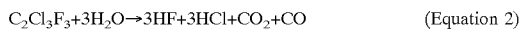

$$C_2Cl_3F_3 + 3H_2O \rightarrow 3HF + 3HCl + CO_2 + CO \quad \text{(Equation 2)}$$

Therefore, if flon 113 is supplied to the piping 22 through the piping 24 by one mole/h, the propane is sufficiently supplied to the heater 1 from the fuel supply piping 47 by one mole/h. In the above case, the steam of which amount is 1.33 times of the necessary amount for catalytic destruction of the flon 113 can be obtained by combustion of the propane. Accordingly, it is not necessary to supply steam from the exterior through the piping 23 in as the embodiment 1. In accordance with the present embodiment, an advantage that the apparatus can be small in size can be realized in addition to the advantages obtained by the embodiment 1, because the steam supplying apparatus from exterior becomes unnecessary.

The main controller 20 calculates the supplying amounts of air and flon 113, and outputs setting values to the corresponding lower controllers 17, 19.

Embodiment 5

Figure 6:
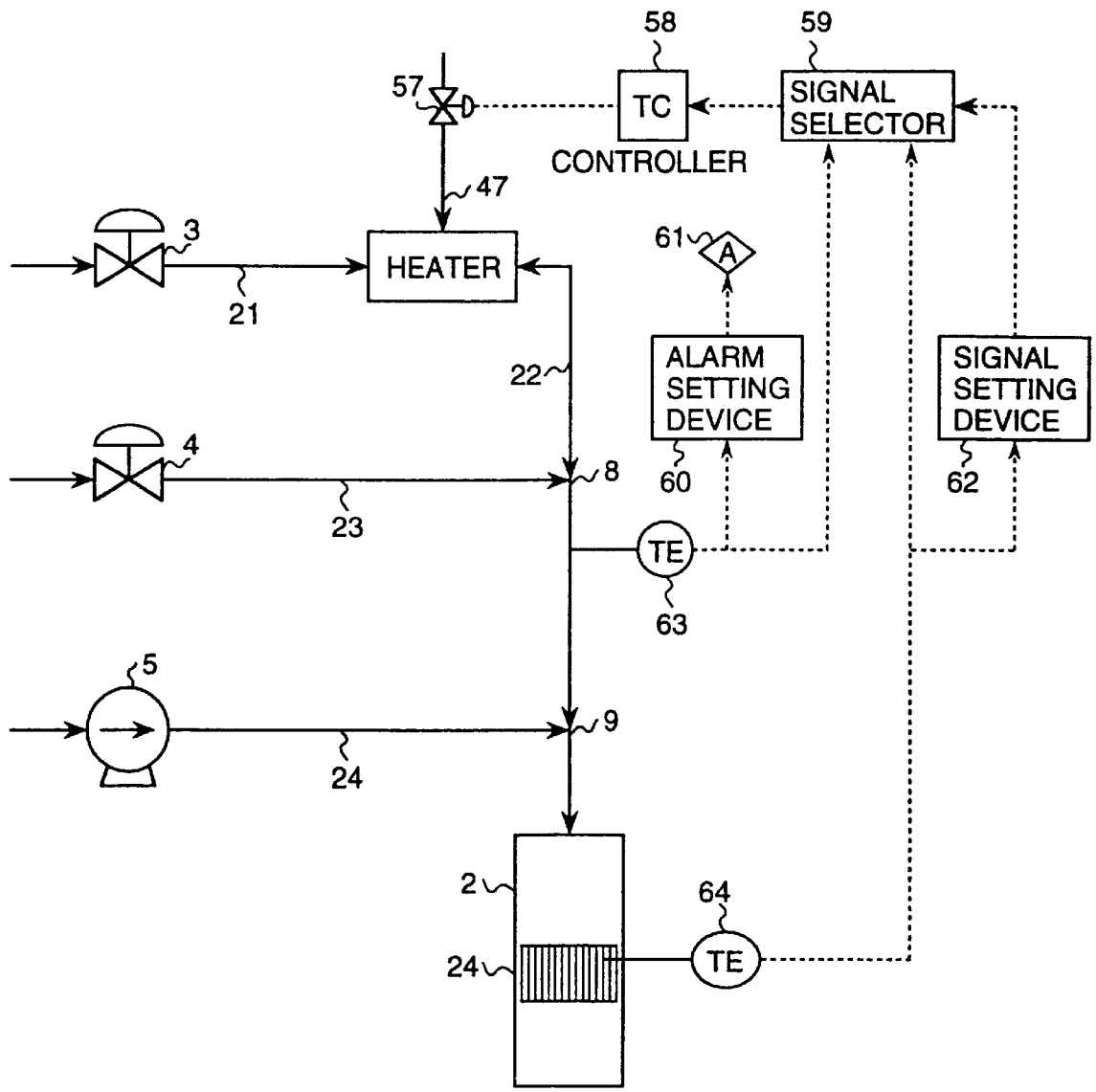

An apparatus for treating organohalogen compound, which is another embodiment of the present invention, is explained referring to FIG. 6 hereinafter. The present embodiment has a composition, which is composed by adding fuel flow rate controller, flow rate control valve 57, and thermometers 63, 64 to the composition of the embodiment 1 shown in FIGS. 1, 2, and 3. The flow rate control valve 57 is provided to the fuel supply piping 47. The thermometer 63 is provided to the piping 22 at the interval between the steam supply position 8 and the flon supply position 9 for determining the temperature of the mixed gas of the heated air and the steam. The thermometer 64 is provided to the catalyst container 2 for determining the temperature of the catalyst layer 24. The fuel flow rate controller comprises the controller 58, signal selector 59, alarm setting device 60, alarm warning device 61, and signal setting device 62.

Steam and flon 113 are mixed with air heated in the heater 1, and the mixture is introduced into the catalyst container 2. As for the catalyst, a catalyst made of titanium oxide-tungsten oxide is used. The catalyst must be maintained at least at least 400° C. for destructing the flon 113 by more than 99.9%. The temperature for partial destruction of the flon 113 is approximately 700° C.

The temperature of the heated air released from the heater 1 is controlled as set forth below.

The output signals from the thermometer 63 (the temperature of the mixed gas of the heated air and the steam) and the thermometer 64 (the temperature of the catalyst layer 24) are transmitted to the signal setting device 62. The signal setting device determines whether the output from the thermometer 64 is lower than 400° C. or not. The signal selector 59 outputs a first setting value, i.e. 650° C. which is lower than 700° C., to the controller 58 for the signal selector, and transmits the output signal from the thermometer 63 to the controller 58, when the signal selector 59 receives a judging signal of lower than 400° C. from the signal setting device 62. The controller 58 regulates the opening of the flow rate control valve 57 based on the first setting value (650° C.) using the output signal from the thermometer 63 as a feed-back signal. As a condition wherein the temperature of the catalyst layer is lower than 400° C., there is a condition at the starting up of the treating apparatus, for instance. The flow rate of the fuel supplied to the heater 1 increases corresponding to the opening of the flow rate control valve 57 regulated by the controller 58, and the temperature of the heated air is elevated. At the starting up of the treating apparatus, the temperature rise of the catalyst is moderate, and accordingly, rapid rise of the temperature of the heated air is necessary in order to shorten the starting up time. As explained above, the output signal from the thermometer 63 is used as the feed back signal. Therefore, the heated air is released from the heater 1 at a temperature, with which the temperature of the heated air becomes 650° C. after mixing with the steam. If the above explained control is not performed, the temperature of the mixed gas of the heated air and the steam has a possibility to exceed 700° C. If flon 113 is supplied in the above condition, flon 113 is contacted with the mixed gas of the heated air and the steam at a high temperature (higher than 700° C.), and the partial destruction of the flon 113 is started. The partial destruction of the flon 113 will cause corrosion of the piping 22 and the catalyst container 2. In accordance with the present embodiment, the rapid temperature rise of the heated air is realized, and the corrosion of the structural material can be prevented.

When the output signal from the thermometer 64 shows a signal higher than 400° C., the signal selector 59 receives a judging signal of higher than 400° C. from the signal setting device 62. The signal selector 59 outputs a second setting value, 430° C. which is higher than 400° C., to the controller 58, and transmits the output signal from the thermometer 64 to the controller 58. The controller 58 regulates the opening of the flow rate control valve 57 based on the second setting value (430° C.) using the output signal from the thermometer 64 as a feed-back signal. The temperature of the heated air is regulated so that the temperature of the catalyst layer 24 becomes 430° C.

The output signal of the thermometer 63 is transmitted to the alarm setting device 60. The alarm setting device 60 operates the alarm warning device 61 when the temperature determined by the thermometer 63 exceeds 630° C. The operator is informed of a danger to destruct the flon 113 in the piping 22 by the operation of the alarm warning device 61. When the output signal from the thermometer 63 shows a signal higher than 650° C., the signal selector 59 outputs a first setting value to the controller 58, and transmits the output signal from the thermometer 63 to the controller 58 as the feed back signal. As the controller 58 regulates based on the first setting value, the temperature of the mixed gas of the heated air and the steam does not exceed 650° C.

In accordance with the present embodiment, the partial destruction of the flon 113 at the upstream region of the catalyst layer 24 can be prevented completely in addition to realizing the advantages obtained by the embodiment 1. Accordingly, corrosion of the structural material at the upstream region of the catalyst layer 24 can certainly be prevented.

Embodiment 6

Figure 7:
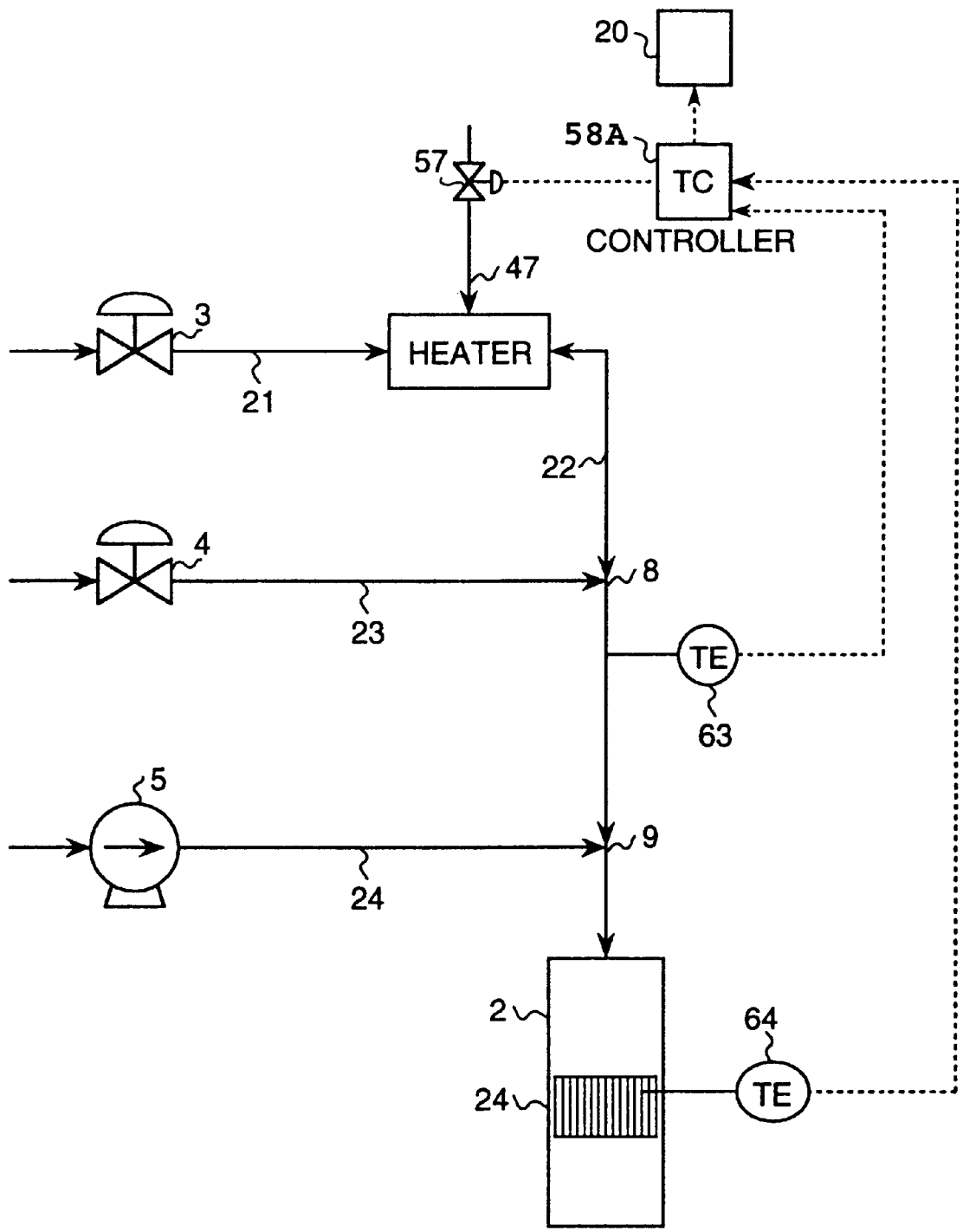
FIG. 7 illustrates embodiment of the fuel flow rate controlling apparatus, FIG. 8 schematically illustrates an apparatus for treating the organohalogen compound in another embodiment of the present invention, and FIG. 9 schematically illustrates an apparatus for treating the organohalogen compound in another embodiment of the present invention.

Another embodiment of the fuel flow rate control apparatus is explained referring to FIG. 7. The fuel flow rate control apparatus of the present embodiment comprises the controller 58A. The composition of the apparatus for treating organohalogen compound is the same as the embodiment 1. The fuel flow rate control apparatus of the present embodiment is aimed at controlling the starting up of the supply of the flon 113 at a stable point when the temperature of the catalyst layer 24 reaches a designated operating temperature. The controller 58A receives the output signals from the thermometers 63, 64.

The heated air released from the heater 1 is introduced into the catalyst container 2. The controller 58A regulates the opening of the flow rate control valve 57 so that the temperature of the catalyst layer 24 becomes 430° C., and controls the amount of the fuel supplied to the heater 1. As the temperature rise of the catalyst layer 24 is slow, the temperature of the catalyst layer overshoots the target temperature (430° C.), but gradually converges to the target temperature. During the period, when the temperature determined by the thermometer 63 becomes sufficiently higher than the temperature of the steam, the controller 58A outputs a steam supply starting signal to the main controller 20. The main controller 20 outputs the steam supply starting signal to the controller 18. Then, supply of the steam is started by opening of the flow rate control valve 4 in accordance with the operation of the controller 18.

When the temperature of the catalyst layer 24 has converged approximately to the target temperature in accordance with the temperature of the thermometer, and the temperature determined by the thermometer 63 is judged by the controller 58A as lower than the destruction temperature of the flon 113, the controller 58A outputs a signal for starting the supply of the organohalogen compound to the main controller 20. The main controller 20 outputs the signal for starting the supply of the organohalogen compound to the controller 17. Then, supply of the flon 113 is started by operating the pump 5 in accordance with the operation of the controller 17.

The catalytic destruction reaction of the flon 113 is exothermic, and the temperature of the catalyst layer 24 rises approximately 30–60° C. Therefore, the supplying amount of the flon 113 is gradually increased from a small amount in order to prevent hunting of the temperature in the catalyst layer 24. The above consideration is necessary for the other organohalogen compound as well.

In accordance with the present embodiment, the flon 113 can be supplied in a condition wherein the temperature is adequately controlled, and the partial destruction of the flon 113 can be prevented. The composition of the present embodiment can be used concurrently with the composition shown in FIG. 6.

Embodiment 7

Figure 8:
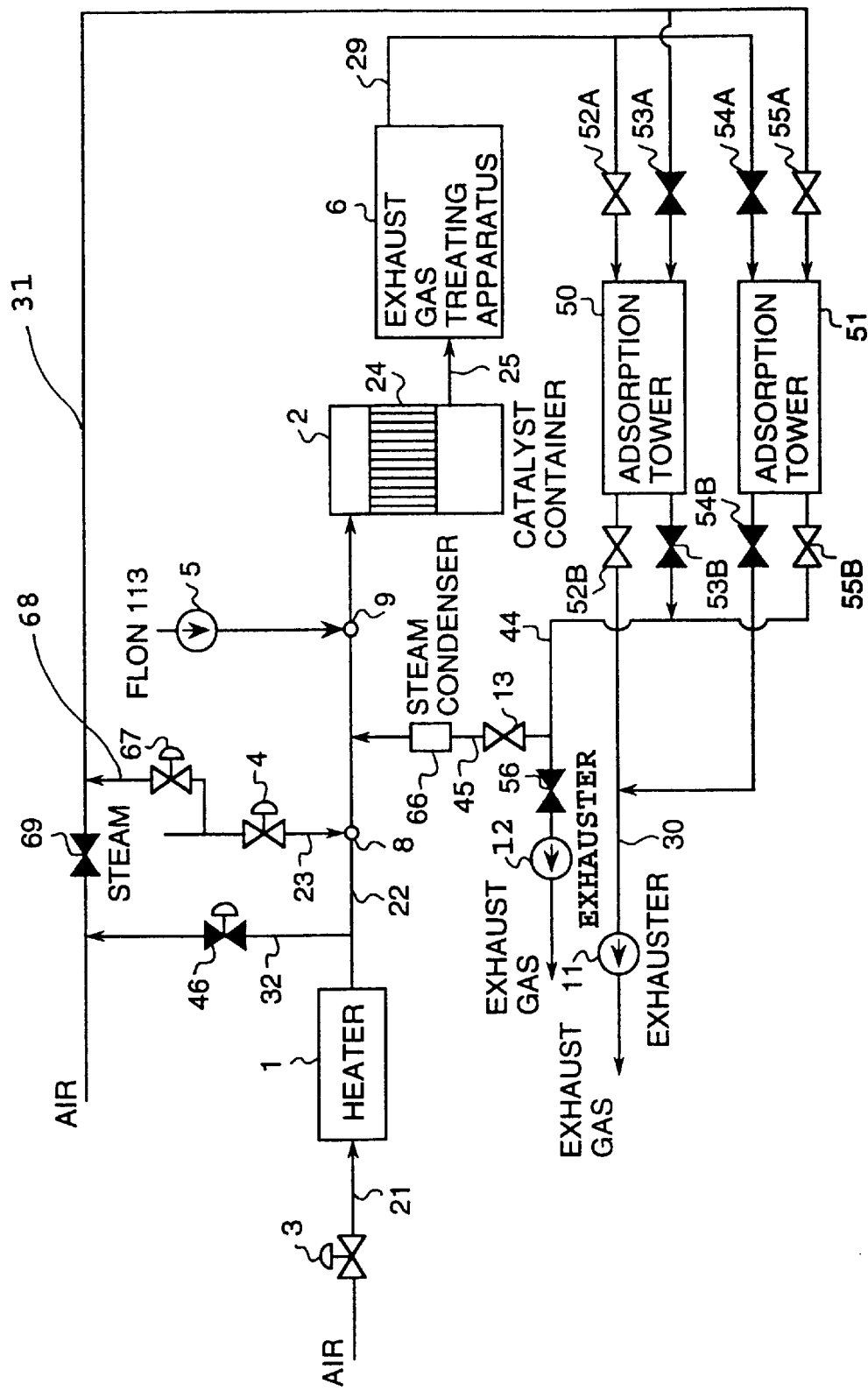

An apparatus for treating an organohalogen compound, which is another embodiment of the present invention, is explained referring to FIG. 8 hereinafter. The composition of the present embodiment differing from an composition shown in FIG. 3 is explained hereinafter. An exhauster 65 is provided to the piping 44 at the downstream region of the open/close valve 56 instead of the exhauster 12 previous described with respect to FIG. 3. The exhauster 65 exhausts fluid from the system and thus creates a negative pressure in the mixing, decomposing and cooling steps. A negative pressure is a pressure lower than atmospheric pressure. The steam condenser 66 is provided to the piping 45. The piping 68 to be connected to the piping 23 is connected to the piping 31 at the downstream region of the open/close valve 69. The open/close valve 69 is provided to the piping 31. The other composition of the apparatus is as same as the composition of the embodiment 1.

In the present embodiment, steam is used as a recovery gas for the adsorption towers 50, 51. The steam is supplied to the piping 31 from the piping 68, and introduced to the adsorption tower to be recovered. The amount of the steam is controlled by regulating the opening of the flow rate control valve 67.

In accordance with the method for recovery and desorption of the present embodiment, the recovery and desorption of the adsorption tower, and destruction of the desorbed and recovered flon 113 can be performed without stopping the operation of the main catalytic destructing operation of the flon 113. However, in the above case, the supplying amount of the steam for recovery and desorption must be small in order to avoid giving any influence to the main catalytic destructing operation of the flon 113. The steam condenser 66 cools the gas containing the desorbed undestructed flon 113, which is to be returned to the piping 22, down to approximately 60° C. to separate the contained steam. Accordingly, the gas containing no steam but flon 113 can be supplied to the piping 22 from the piping 45. Furthermore, the amount of the steam supplied to the catalyst container 2 can be regulated adequately by the controller 18. In accordance with the installation of the steam condenser 66, the influence of the uncontrolled steam to the main catalytic destruction operation of flon 113 can be suppressed.

In a method wherein the adsorption tower is desorbed and recovered by passing the steam through the tower for a designated period and subsequently the tower is dried by heated air, a part of the heated air which is introduced to the piping 31 from the downstream region of the heater 1 through the piping 32 can be used as the heated air for drying the tower by passing through the corresponding tower. The adsorption tower after the drying can be cooled readily by passing through only air from the piping 31 by closing the flow rate control valve 52A.

The same advantages as the embodiment 1 can be obtained by the present embodiment.

Embodiment 8

Figure 9:
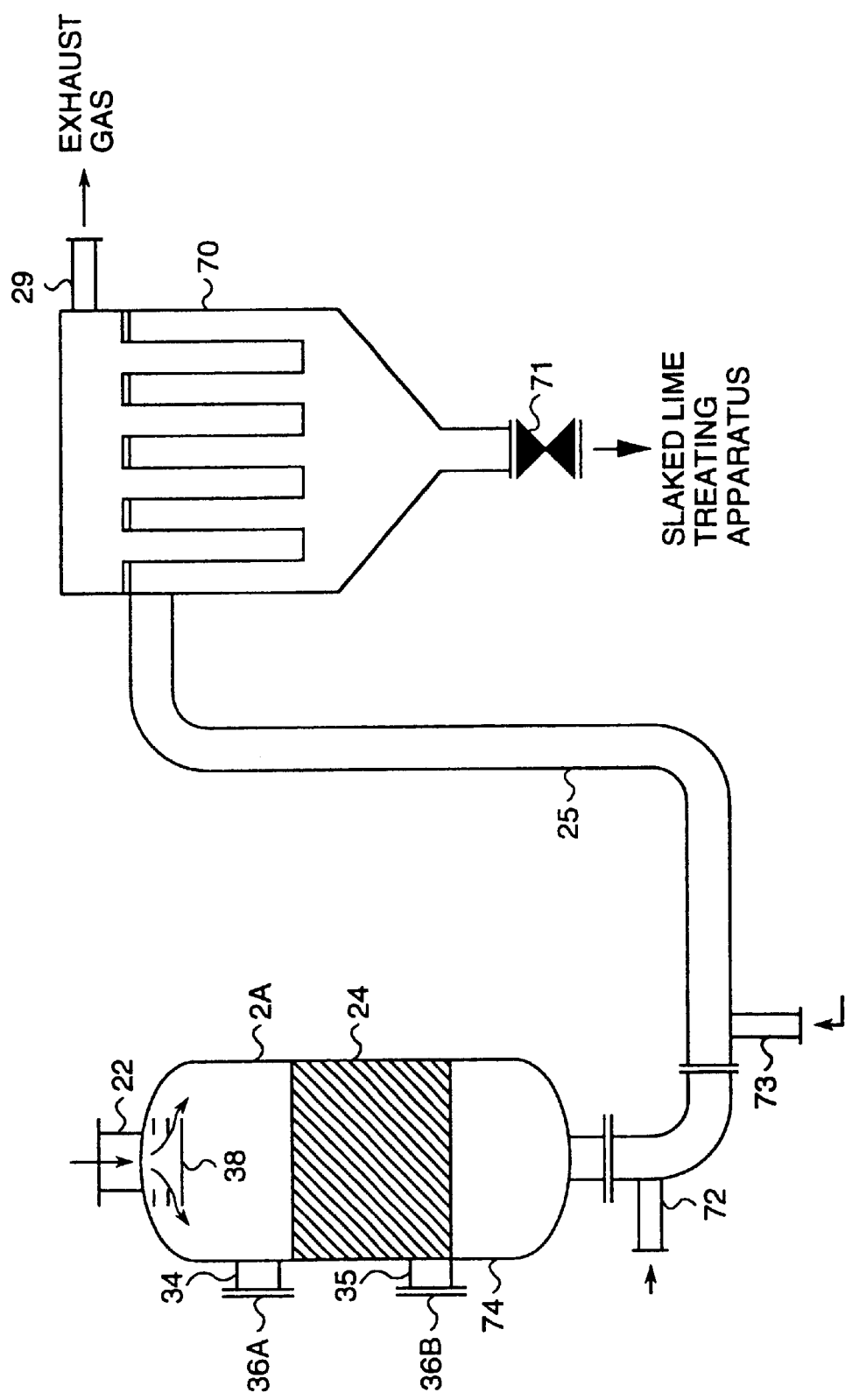

An apparatus for treating an organohalogen compound, which is another embodiment of the present invention, is explained referring to FIG. 9 hereinafter. The composition of the present embodiment differs from the composition of the embodiment 1 in the positions of the catalyst container 2 and the exhaust gas treating apparatus 6, which have been changed as shown in FIG. 9. That means, the composition of the embodiment shown in FIG. 2 has been changed to the new composition as shown in FIG. 9. On the contrary to the previous embodiments, wherein wet type exhaust gas treating apparatus are used, the present embodiment uses a dry type exhaust gas treating apparatus.

Figure 2:
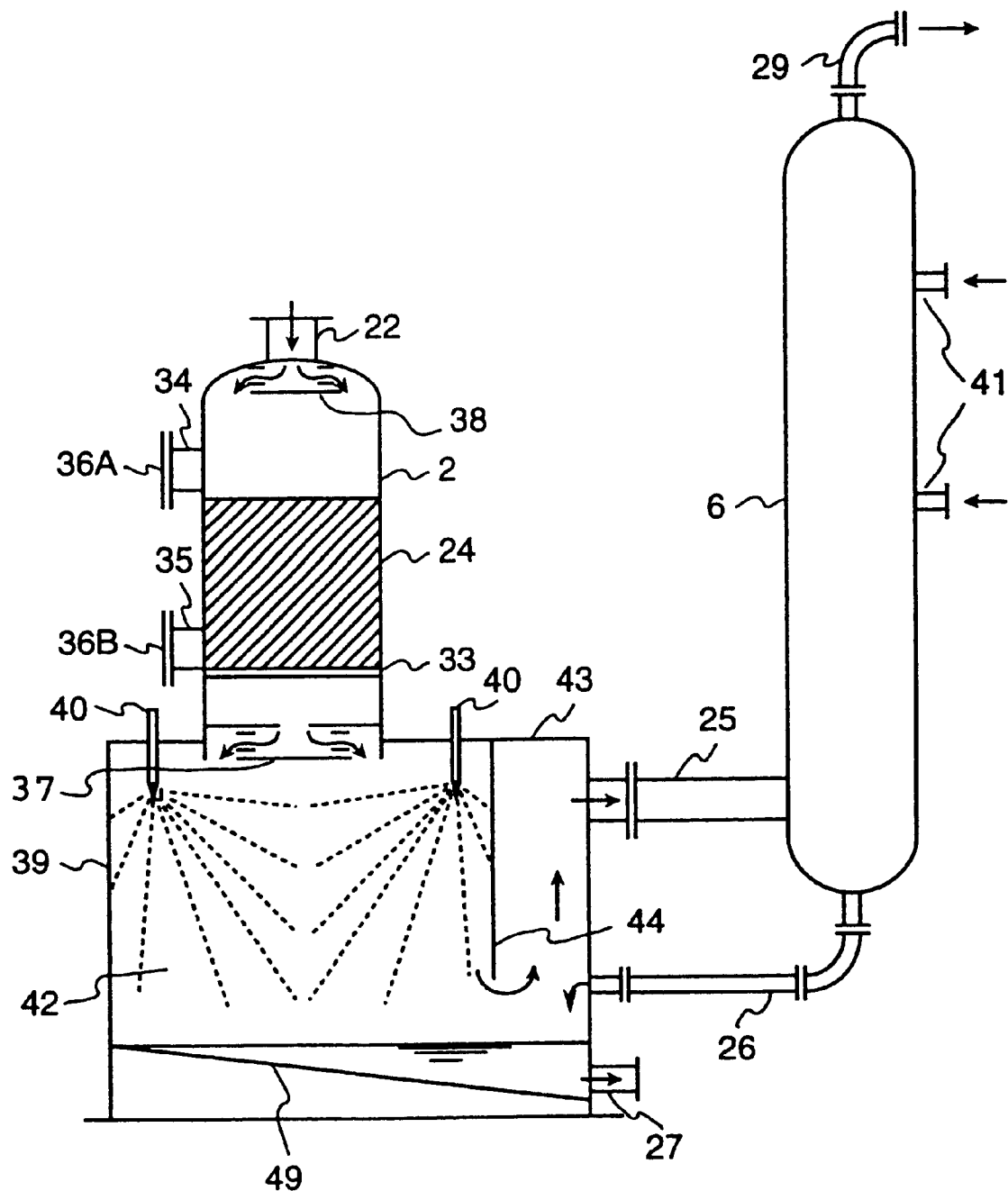
FIG. 2 illustrates in detail the catalyst container and the exhaust gas treating apparatus shown in FIG. 1.
Figure 3:
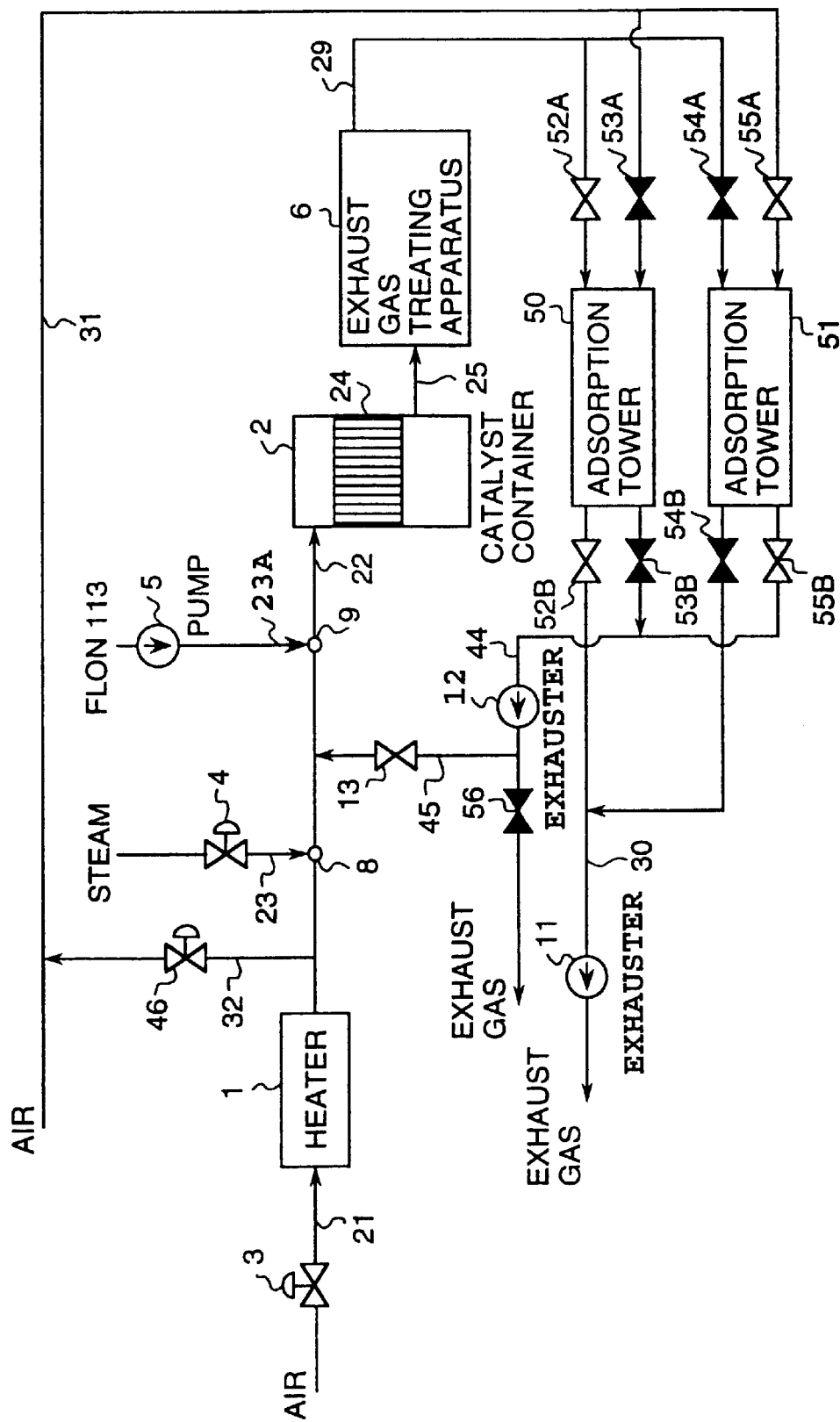
FIG. 3 illustrates in detail the apparatus for adsorbing the organohalogen compound shown in FIG. 1, FIG. 4 schematically illustrates an apparatus for treating the organohalogen compound in another embodiment of the present invention, FIG. 5 schematically illustrated an apparatus for treating the organohalogen compound in another embodiment of the present invention, FIG. 6 schematically illustrates an apparatus for treating the organohalogen compound in another embodiment of the present invention.

The portion different from the composition shown in FIG. 2 is explained hereinafter. The space 74 formed at the downstream region of the catalyst layer 24 in the catalyst container 2A is connected to the bag filter 70 via the piping 25. The bag filter 70 is connected to the organohalogen compound adsorption apparatus 7 via the piping 29. The open/close valve provided at the bottom portion of the bag filter 70 is connected to a slaked lime treating apparatus (not shown in the figure) by piping. The cooling air supplying pipe 72 is connected to the piping 25 at a portion near the space 74. The slaked lime supplying pipe 73 is connected to the piping 25.

The exhaust gas including the acidic gas which is generated by the catalytic destruction of the flon 113 is introduced into the piping 25 via the space 74. The temperature of the exhaust gas decreases rapidly to 100° C. by supplying cooling air to the piping 25 through the cooling air supplying pipe 72. The cooling air has the same effect as the cooling water which is sprayed from the spray nozzles 40 in the embodiment 1. When an organic compound containing chlorine is treated as the objective organohalogen compound in the present embodiment, generation of poisonous gas such as dioxine and the like can be prevented because the temperature of the exhaust gas decreases rapidly by the effect of the cooling air.

The slaked lime supplied from the slaked lime supplying pipe 73 absorbs the acidic gas contained in the exhaust gas. Therefore, the acidic gas is eliminated form the exhaust gas. The slaked lime reacted with the acidic gas is separated by the bag filter 70. The separated slaked lime is transferred to the slaked lime treating apparatus by opening the open/close valve 71, and treated. The exhaust gas separated from the slaked lime is introduced into the organohalogen compound adsorption apparatus 7.

The present embodiment realizes the same advantages as the embodiment 1.

What is claimed is:

1. An apparatus for processing organohalogen compounds comprising:

a catalyst container containing a catalyst layer in which the organohalogen compounds are decomposed, a supplying path for supplying a carrier gas containing the organohalogen compounds and steam to said catalyst container, a cooling chamber connected to a bottom of said catalyst container whereby said cooling chamber is at a position lower than said catalyst container;

a spraying apparatus mounted in said cooling chamber for spraying a cooling liquid to cool exhaust gas containing a decomposed gas of said organohalogen compounds exhausted from said catalyst layer; and a baffle member forming a bent path which introduces the exhaust gas containing the decomposed gas into said cooling chamber from said catalyst container, and mounted in said cooling chamber for preventing mists generated by spraying cooling liquid from said spraying apparatus from back flowing into said catalyst container; and wherein said spraying apparatus is arranged at a position downstream of said baffle member in said cooling chamber.

2. An apparatus for processing organohalogen compounds as claimed in claim 1, which further comprises an exhaust gas processing apparatus for removing an acidic gas contained in the exhaust gas exhausted from said cooling chamber.

3. An apparatus for processing organohalogen compounds as claimed in claim 1, which further comprises an adsorbing tower filled with an adsorbent for adsorbing undecomposed organohalogen compounds contained in exhaust gas, which is exhausted from said cooling chamber and conducted to said adsorbing tower.

4. An apparatus for processing organohalogen compounds as claimed in claim 3, which further comprises a supplying apparatus for conducting said undecomposed organohalogen compounds desorbed from said adsorbent to said catalyst container.

5. An apparatus for processing organohalogen compounds as claimed in claim 1 which further comprises an exhauster for maintaining a negative pressure in said apparatus.

6. An apparatus for processing organohalogen compounds comprising:

a catalyst container containing a catalyst layer in which the organohalogen compounds are decomposed, a supplying path for supplying a carrier gas containing the organohalogen compounds and steam to said catalyst container, a cooling chamber arranged at a position lower than said catalyst container;

a spraying apparatus mounted in said cooling chamber for spraying a cooling liquid to cool exhaust gas containing a decomposed gas of said organohalogen compounds exhausted from said catalyst layer;

a baffle member forming a bent path which introduces the exhaust gas containing the decomposed gas into said cooling chamber from said catalyst container, and mounted in said cooling chamber for preventing mists generated by spraying cooling liquid from said spraying apparatus from back flowing into said catalyst container; and an adsorbing tower filled with an adsorbent for adsorbing undecomposed organohalogen compounds contained in exhaust gas, which is exhausted from said cooling chamber and conducted to said adsorbing tower; and wherein said supplying path comprises a heating apparatus for heating the carrier gas, a steam path for supplying steam is connected to said supplying path downstream of said heating apparatus, and an organohalogen path for supplying said organohalogen compounds is connected to said supplying path downstream of the connecting point of the steam path and the supplying path.

* * * * *